Figure 1:
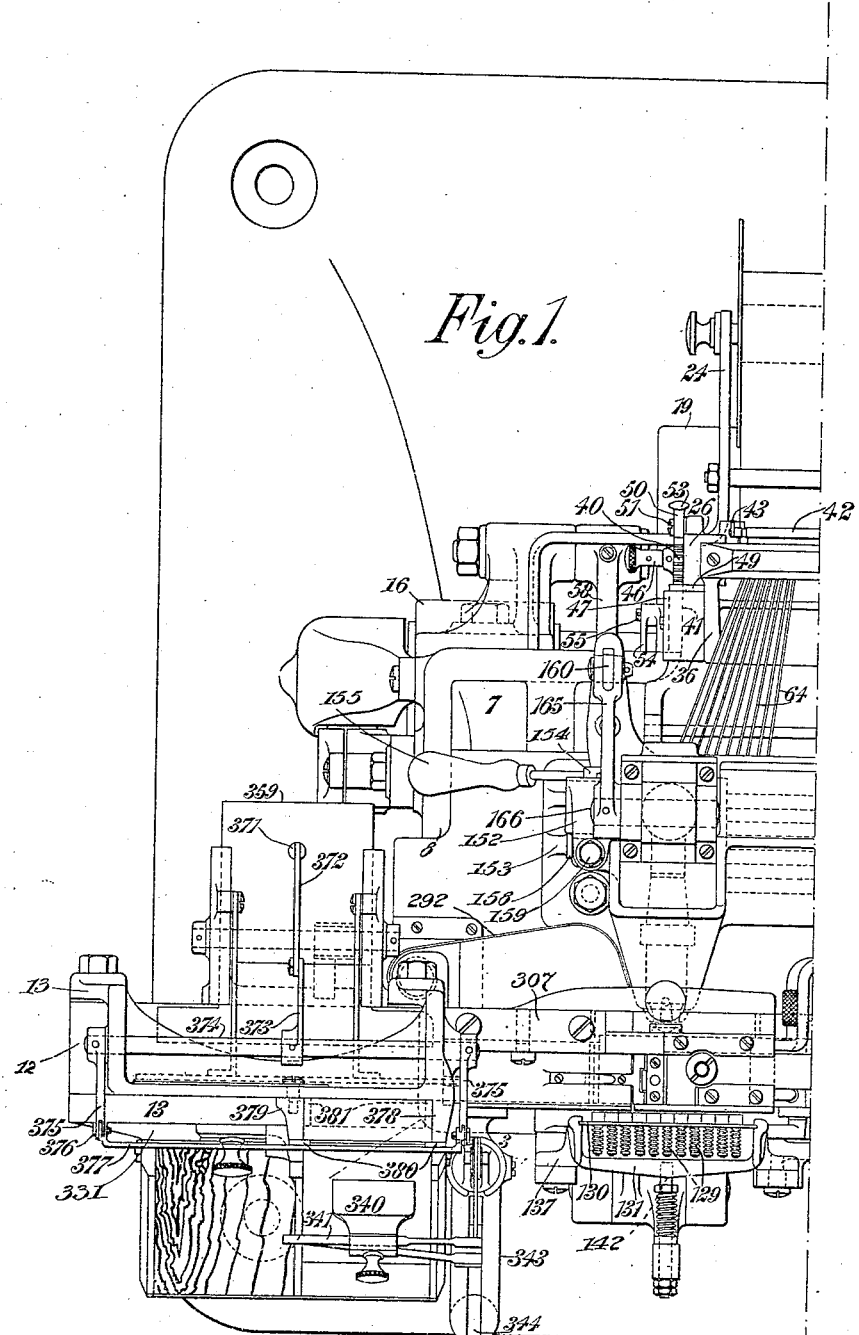

W. G. WHITE.
TYPE CASTING AND COMPOSING MACHINE.
APPLICATION FILED SEPT. 17, 1906.

943,612.

Patented Dec. 14, 1909.
24 SHEETS—SHEET 1.

Witnesses

Woolman Gibson White
Inventor per Chas. S. Woodroffe
Attorney

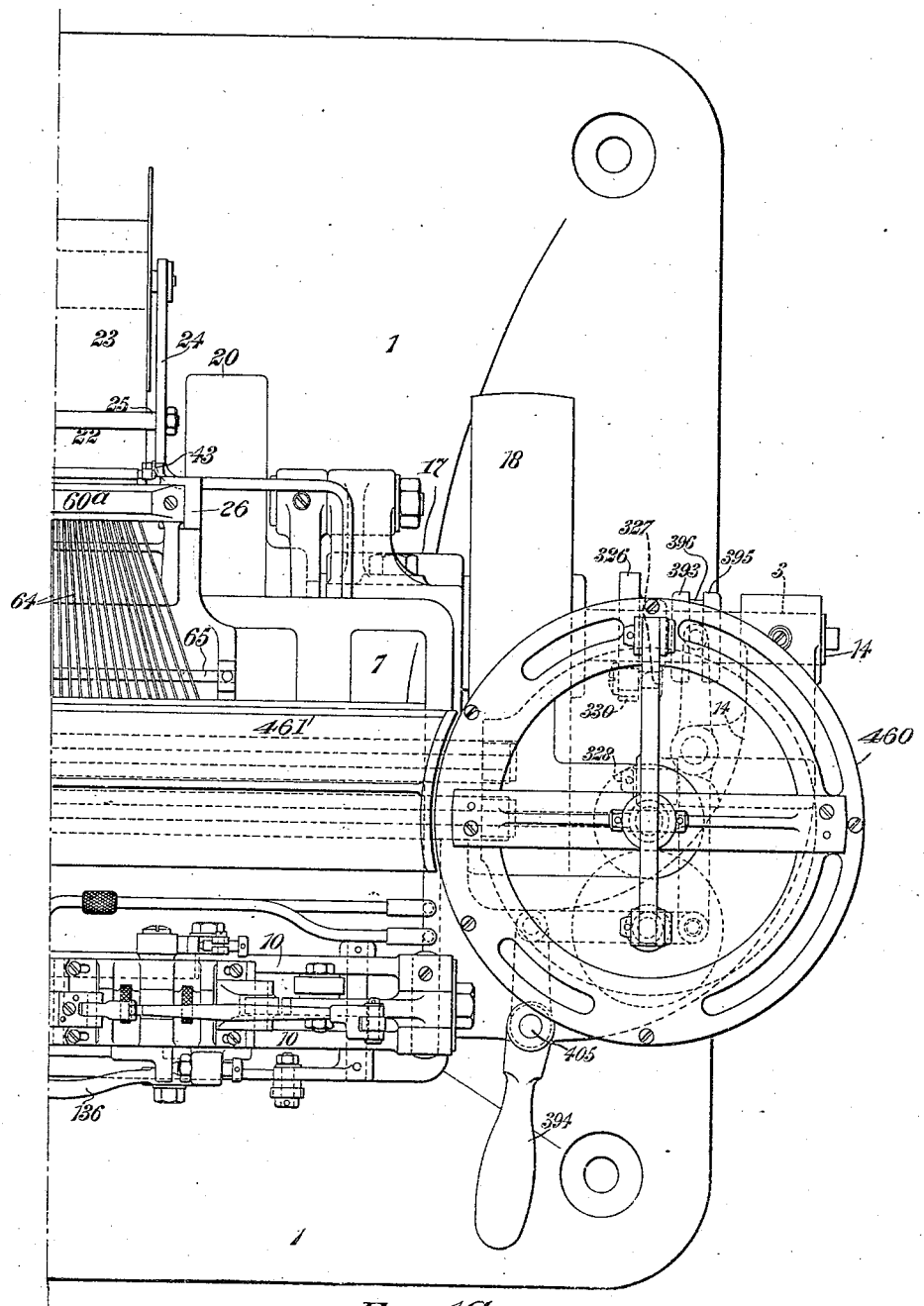

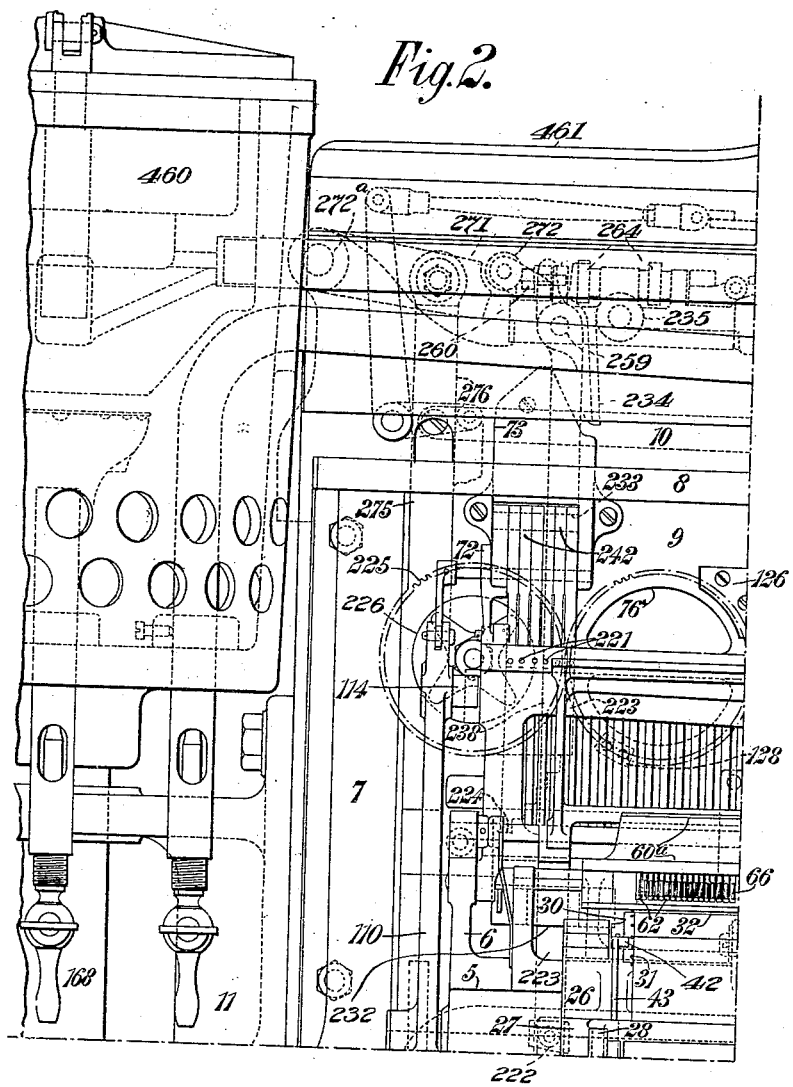

W. G. WHITE.
TYPE CASTING AND COMPOSING MACHINE.
APPLICATION FILED SEPT. 17, 1906.
943,612.
Patented Dec. 14, 1909.
24 SHEETS—SHEET 4.
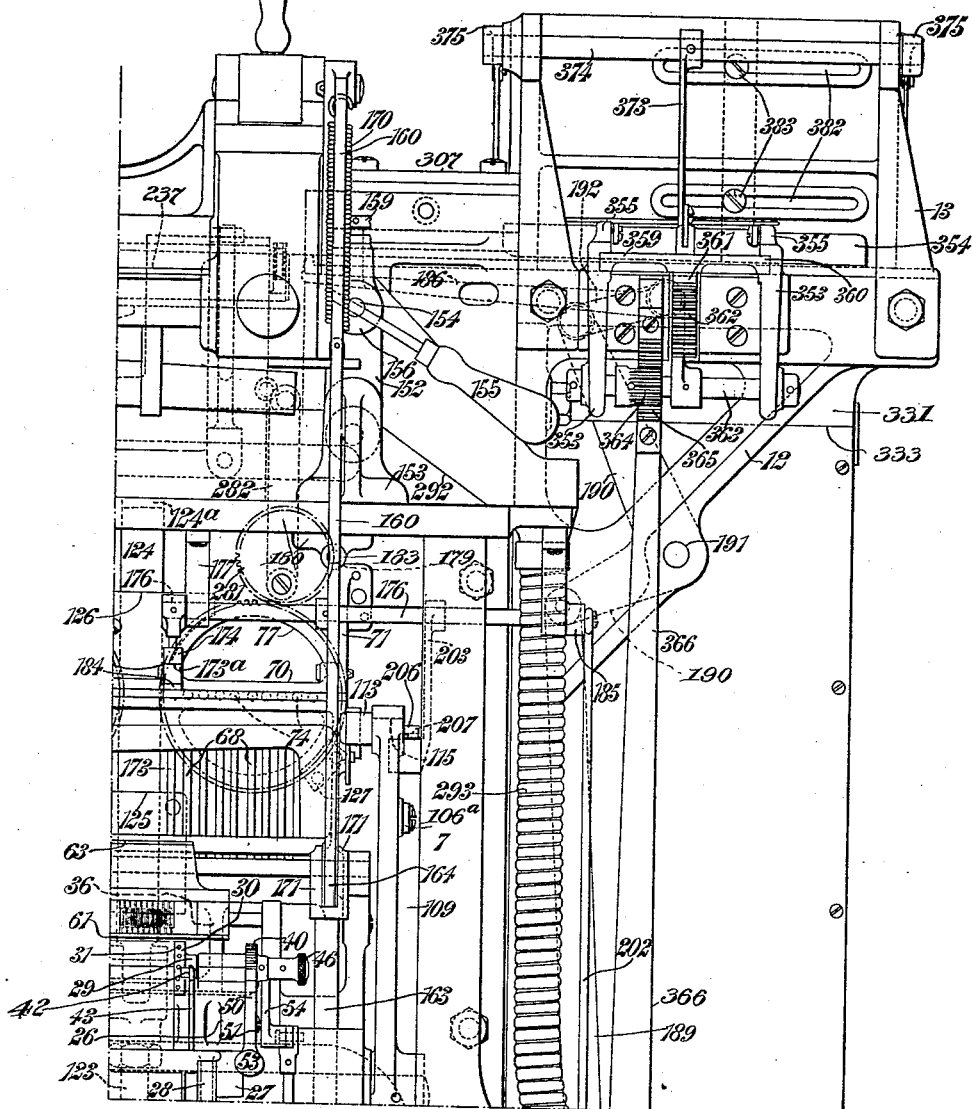
Fig. 2ª
Witnesses
Woolman Gibson White.
Inventor
per Chas. S. Woodroffe,
Attorney W. G. WHITE.
TYPE CASTING AND COMPOSING MACHINE.
APPLICATION FILED SEPT. 17, 1906.
943,612.
Patented Dec. 14, 1909.
24 SHEETS—SHEET 5.
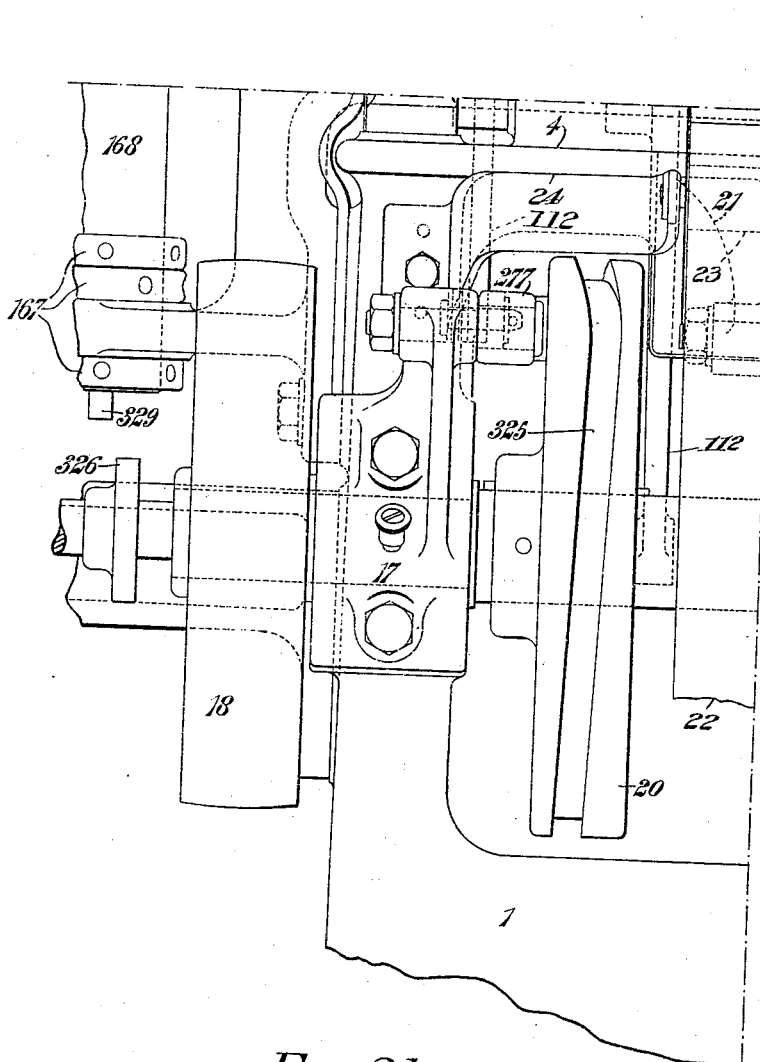
Fig. 2ᵇ
Witnesses
Woolman Gibson White
Inventor
per Chas. S. Woodroffe,
Attorney W. G. WHITE.
TYPE CASTING AND COMPOSING MACHINE.
APPLICATION FILED SEPT. 17, 1906.

943,612.

Patented Dec. 14, 1909.
24 SHEETS—SHEET 6.

Witnesses
W. C. Robinson
F. A. Clemo.

Woolman Gibson White
Inventor per Chas. S. Woodroffe
Attorney

W. G. WHITE.
TYPE CASTING AND COMPOSING MACHINE.
APPLICATION FILED SEPT. 17, 1906.
943,612.
Patented Dec. 14, 1909.
24 SHEETS—SHEET 7.
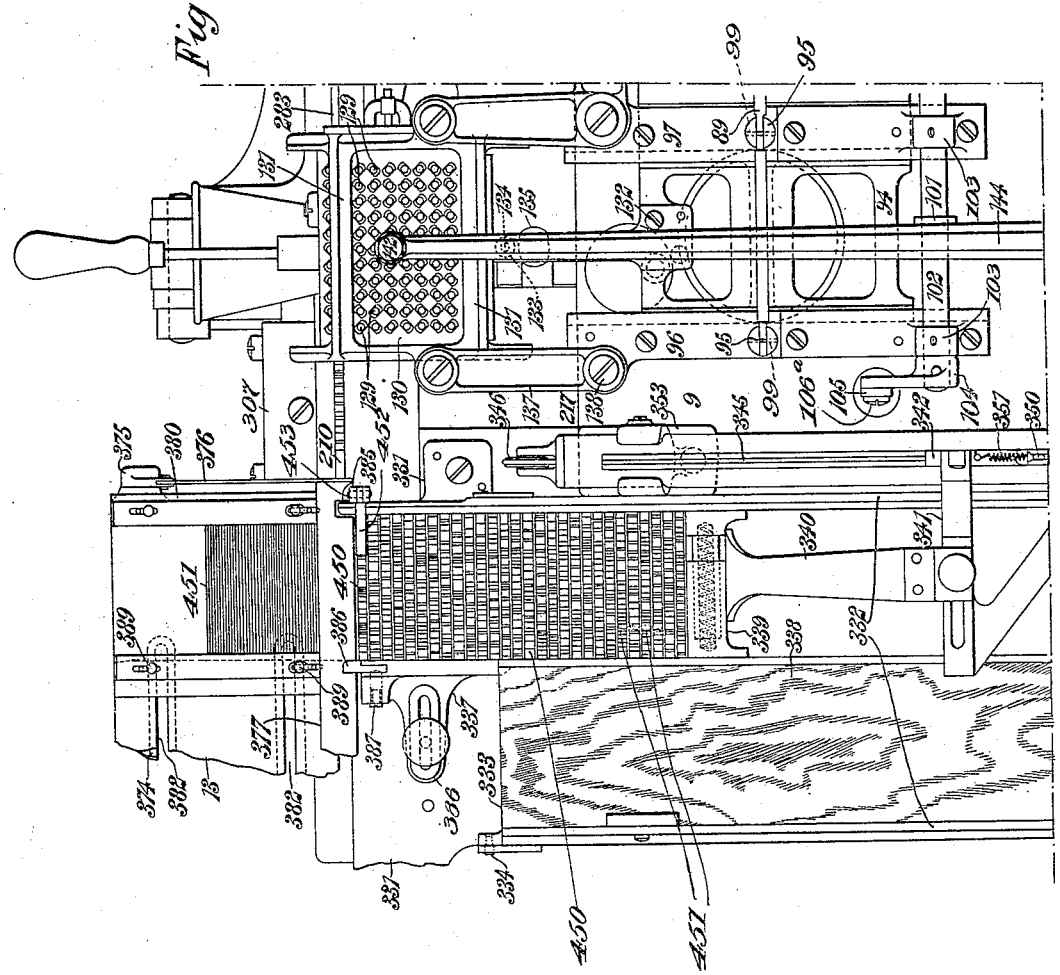
Witnesses
Woolman Gibson White
Inventor
per Chas. S. Woodroffe
Attorney W. G. WHITE.
TYPE CASTING AND COMPOSING MACHINE.
APPLICATION FILED SEPT. 17, 1906.
943,612.
Patented Dec. 14, 1909.
24 SHEETS—SHEET 8.
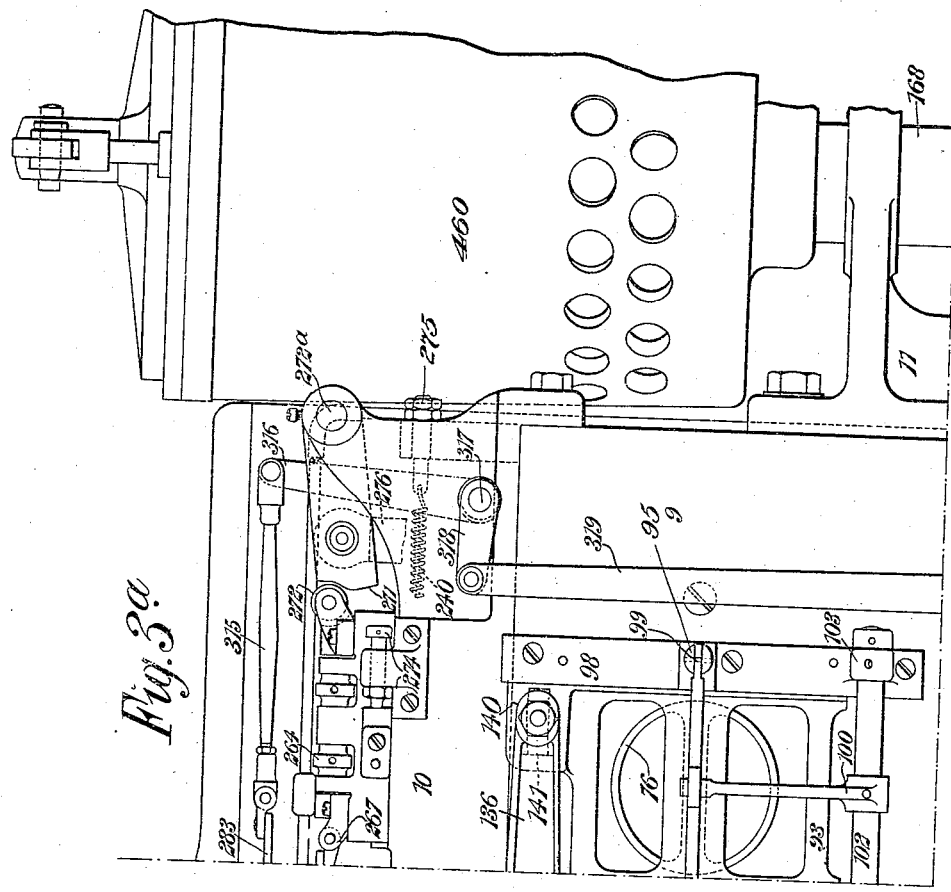
Witnesses
W. P. Robinson
F. A. Clemo
Woolman Gibson White
Inventor
per Chas. S. Woodroffe,
Attorney W. G. WHITE.
TYPE CASTING AND COMPOSING MACHINE.
APPLICATION FILED SEPT. 17, 1906.
943,612.
Patented Dec. 14, 1909.
24 SHEETS—SHEET 9.
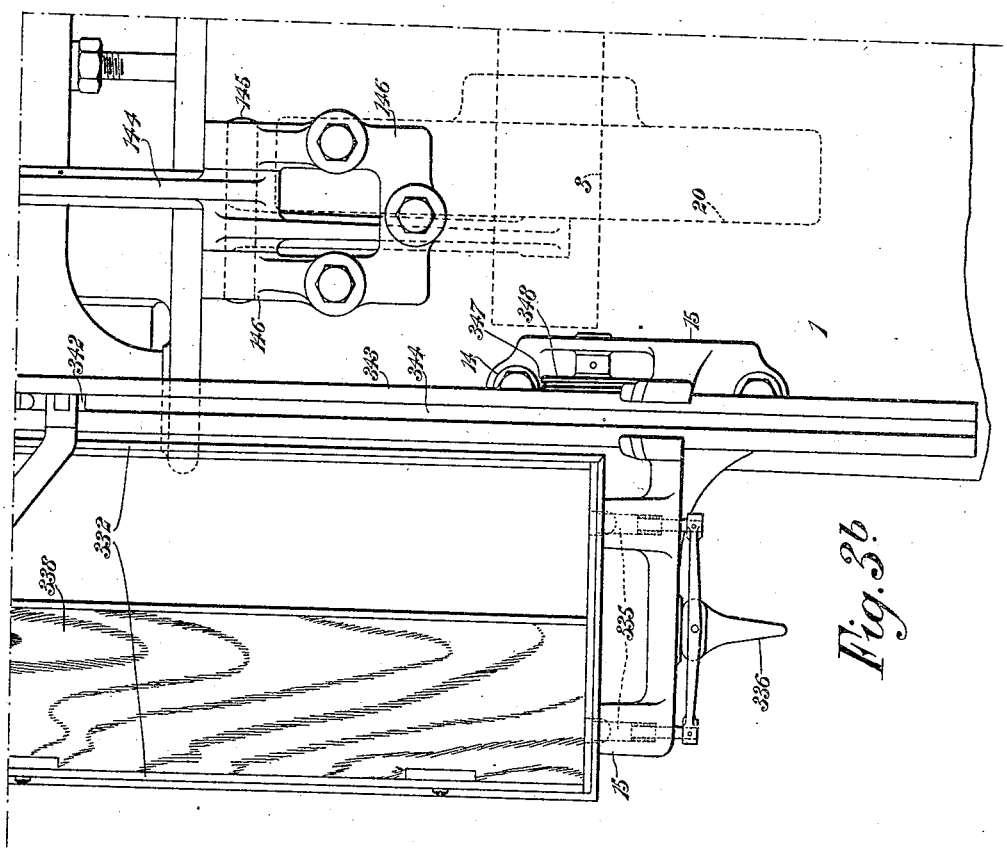
Witnesses
Woolman Gibson White
Inventor
per Chas. S. Woodroff,
Attorney

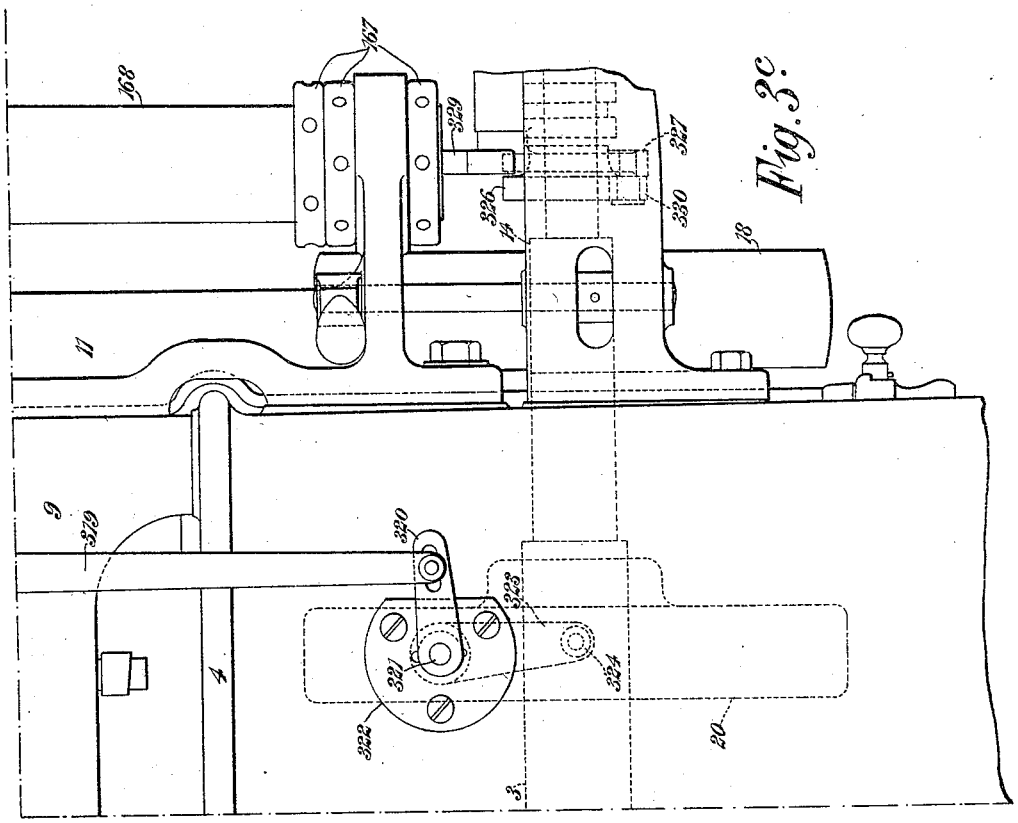

W. G. WHITE.
TYPE CASTING AND COMPOSING MACHINE.
APPLICATION FILED SEPT. 17, 1906.
943,612.
Patented Dec. 14, 1909.
24 SHEETS—SHEET 11.
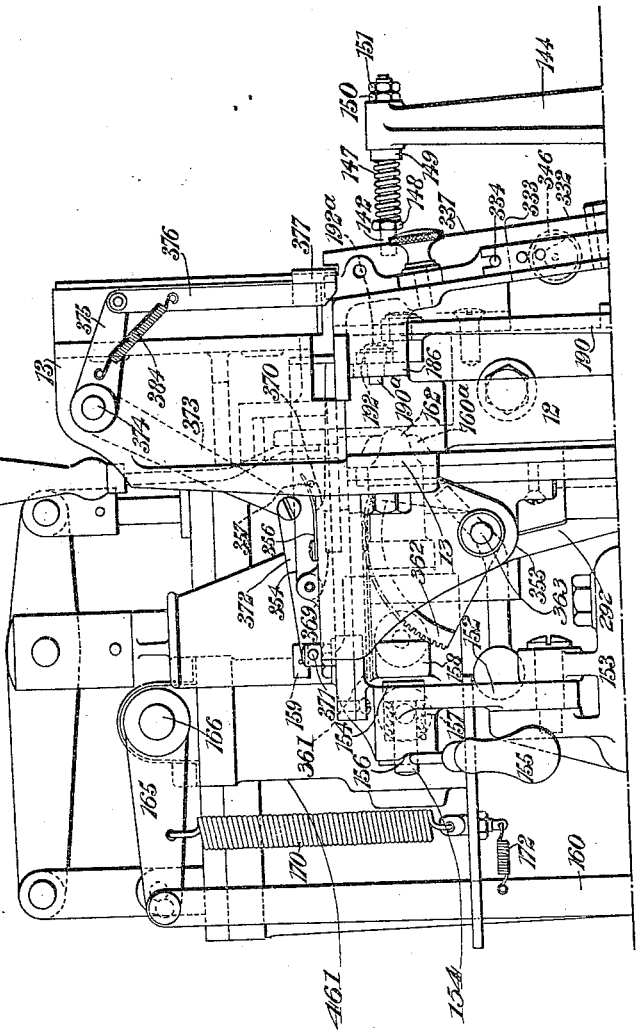
Witnesses
Woolman Gibson White
Inventor
per Chas. S. Woodroffe,
Attorney

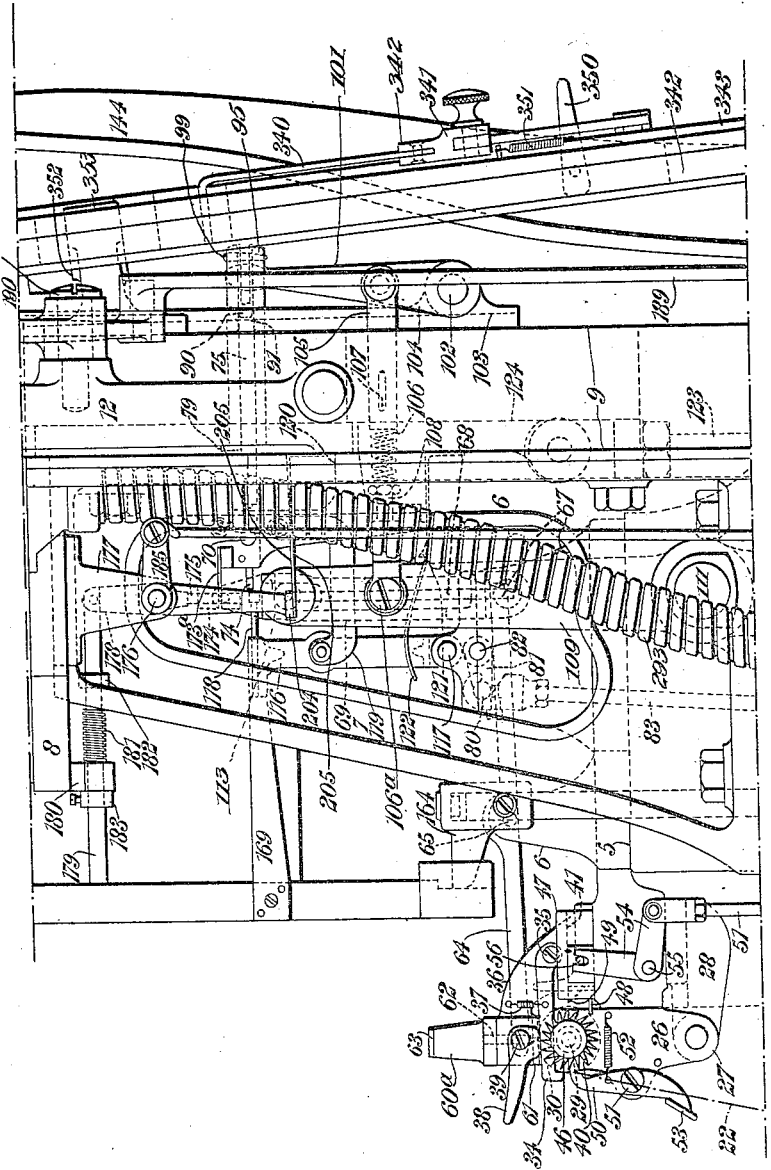

W. G. WHITE.
TYPE CASTING AND COMPOSING MACHINE.
APPLICATION FILED SEPT. 17, 1906.
943,612.
Patented Dec. 14, 1909.
24 SHEETS—SHEET 13.
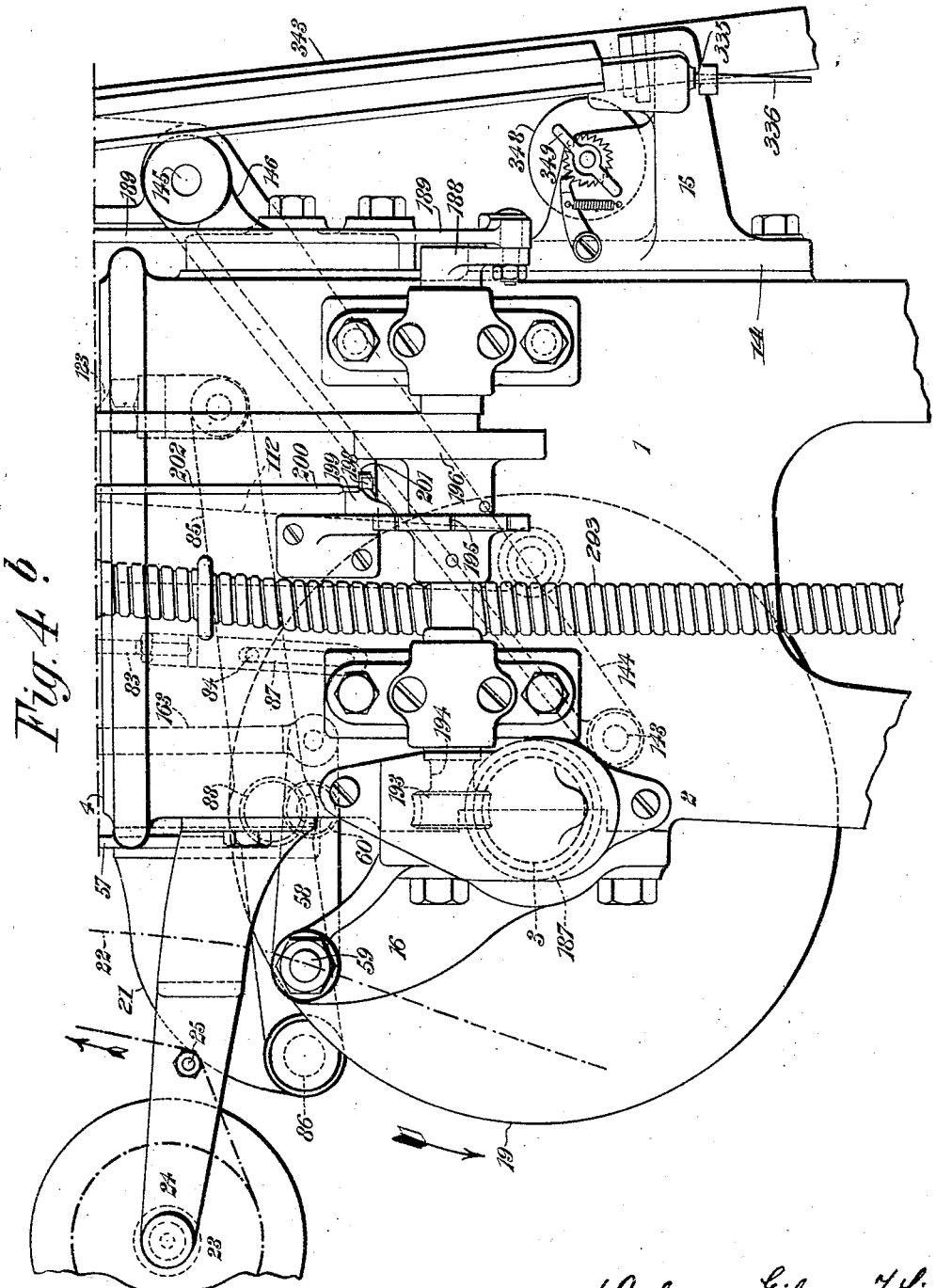
Witnesses
Woolman Gibson White
Inventor
per Chas. S. Woodroffe,
Attorney

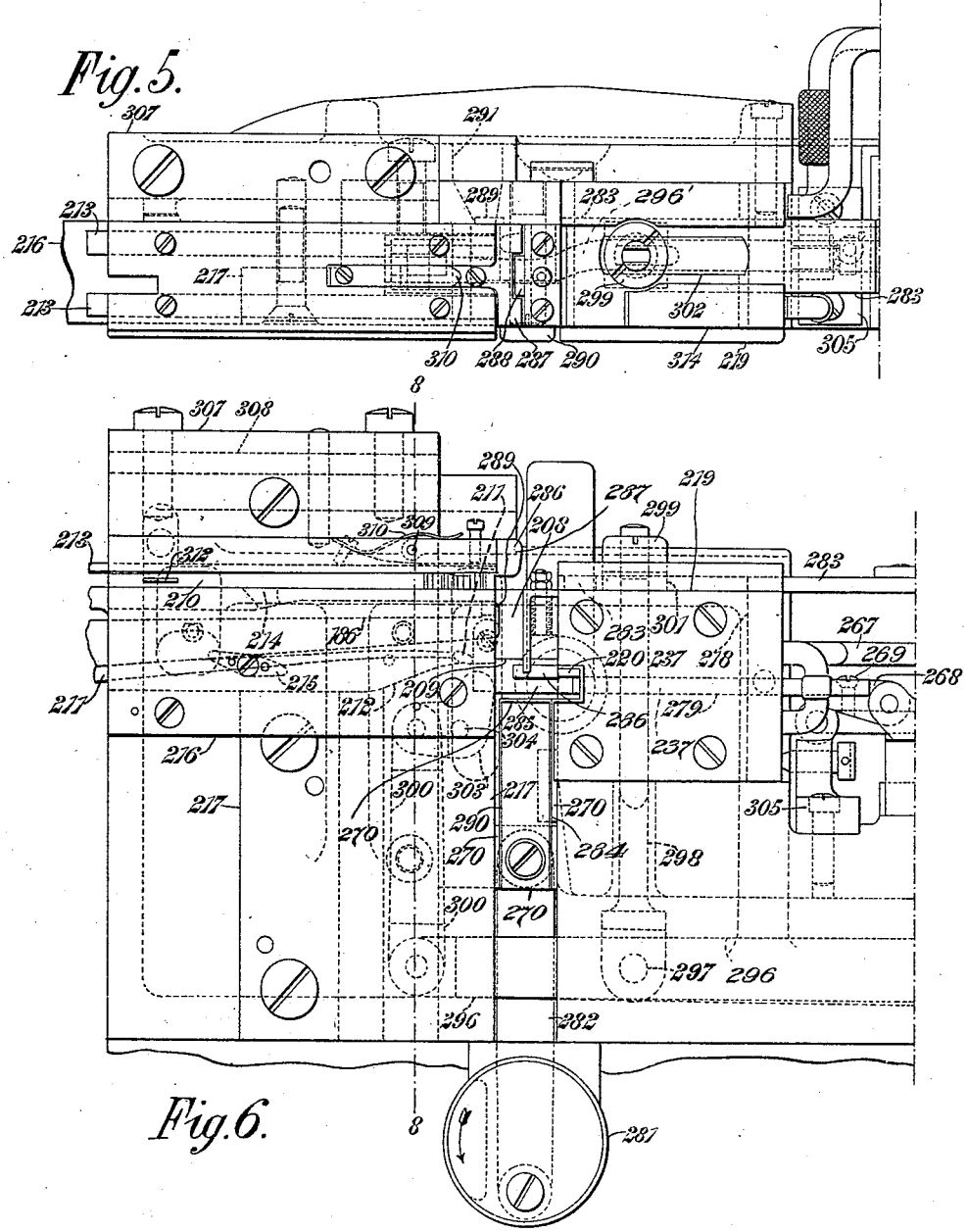

W. G. WHITE.
TYPE CASTING AND COMPOSING MACHINE.
APPLICATION FILED SEPT. 17, 1906.
943,612.
Patented Dec. 14, 1909.
24 SHEETS—SHEET 15.
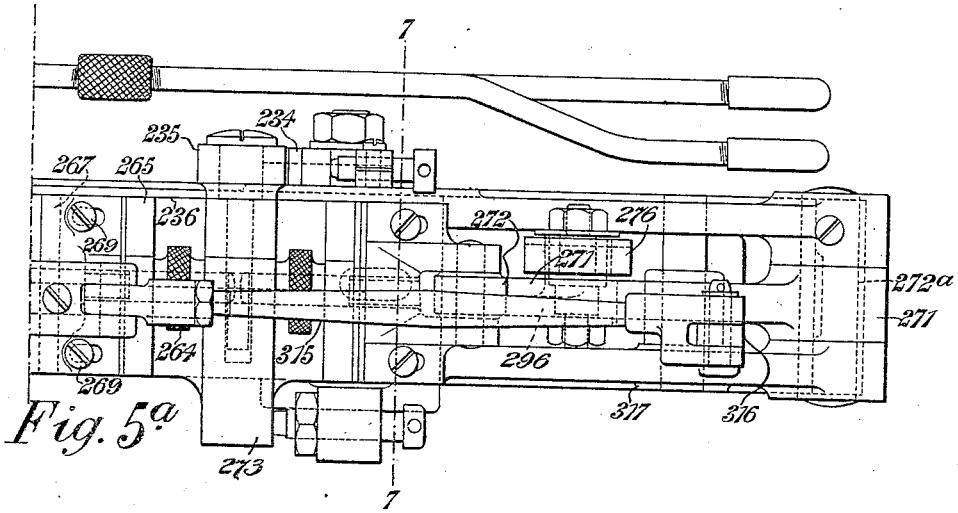
Fig. 5ª
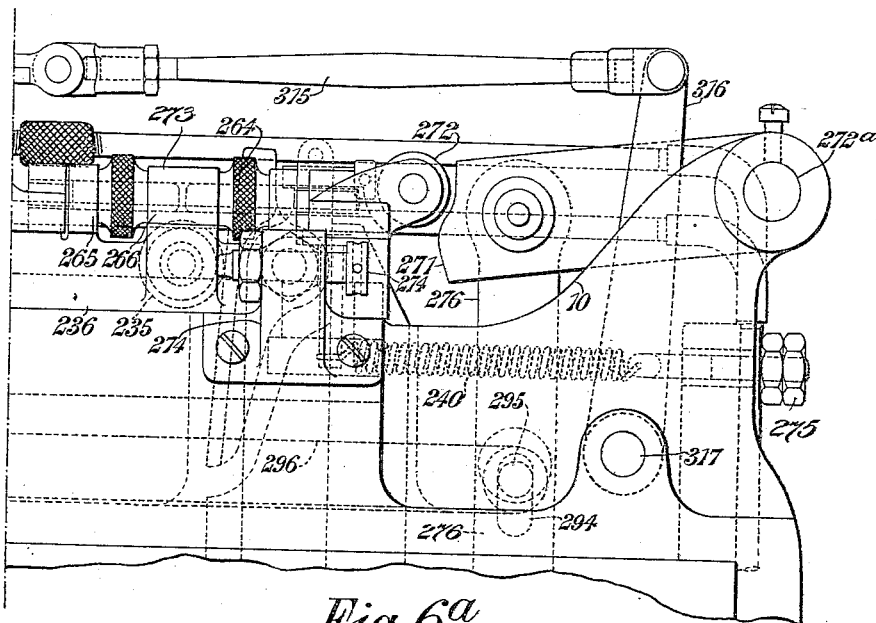
Fig. 6ª
Witnesses
W. E. Robinson
F. A. Clemo
Woolman Gibson White
Inventor
per Chas. S. Woodroffe,
Attorney

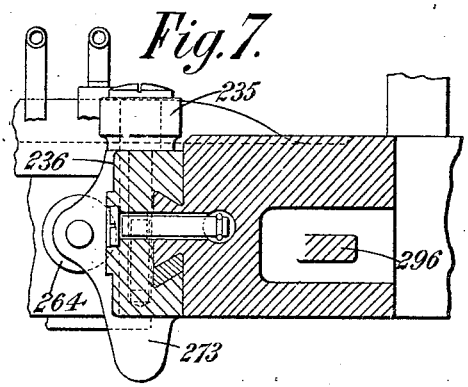
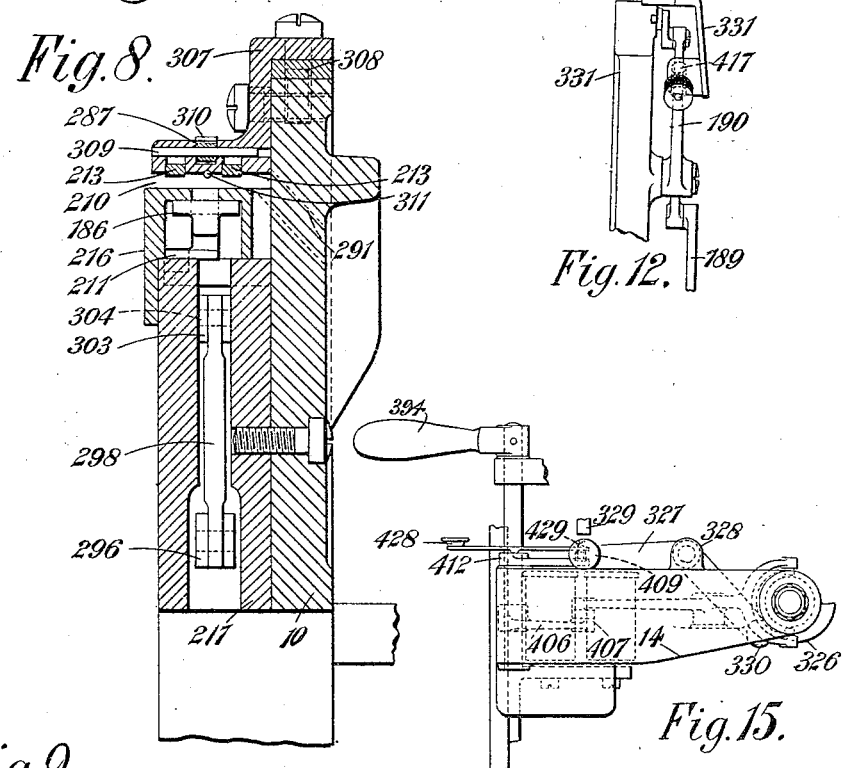
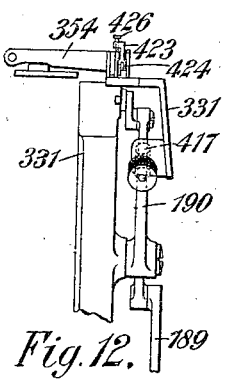
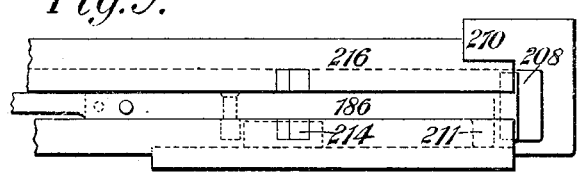

W. G. WHITE.
TYPE CASTING AND COMPOSING MACHINE.
APPLICATION FILED SEPT. 17, 1906.
943,612.
Patented Dec. 14, 1909.
24 SHEETS—SHEET 17.
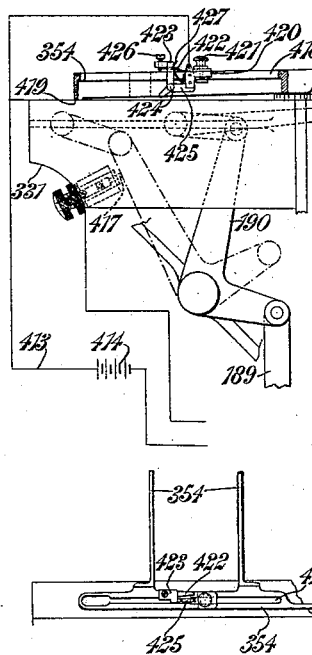
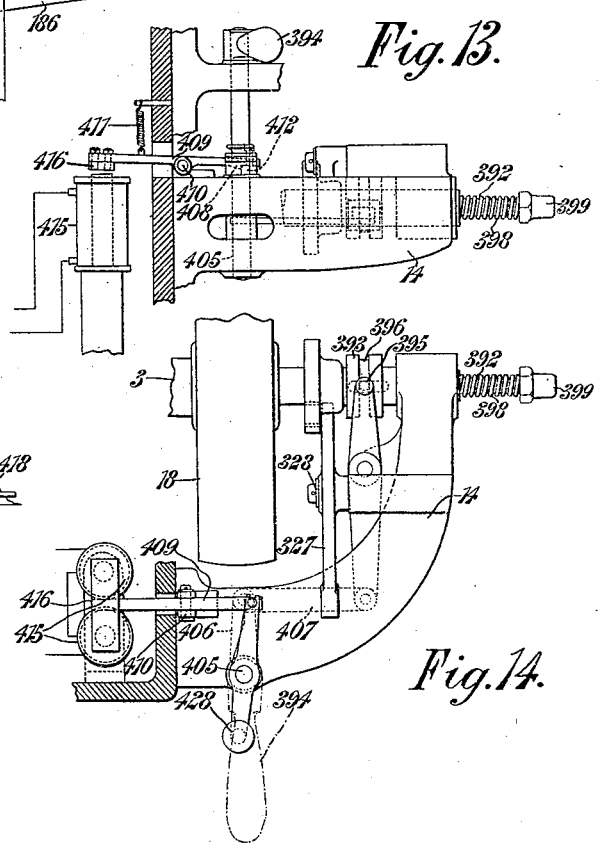
Witnesses
Woolman Gibson White
Inventor
per Chas. S. Woodroffe
Attorney W. G. WHITE.
TYPE CASTING AND COMPOSING MACHINE.
APPLICATION FILED SEPT. 17, 1906.

943,612.

Patented Dec. 14, 1909.
24 SHEETS—SHEET 19.

Witnesses

Woolman Gibson White
Inventor per Chas J. Woodroffe
Attorney

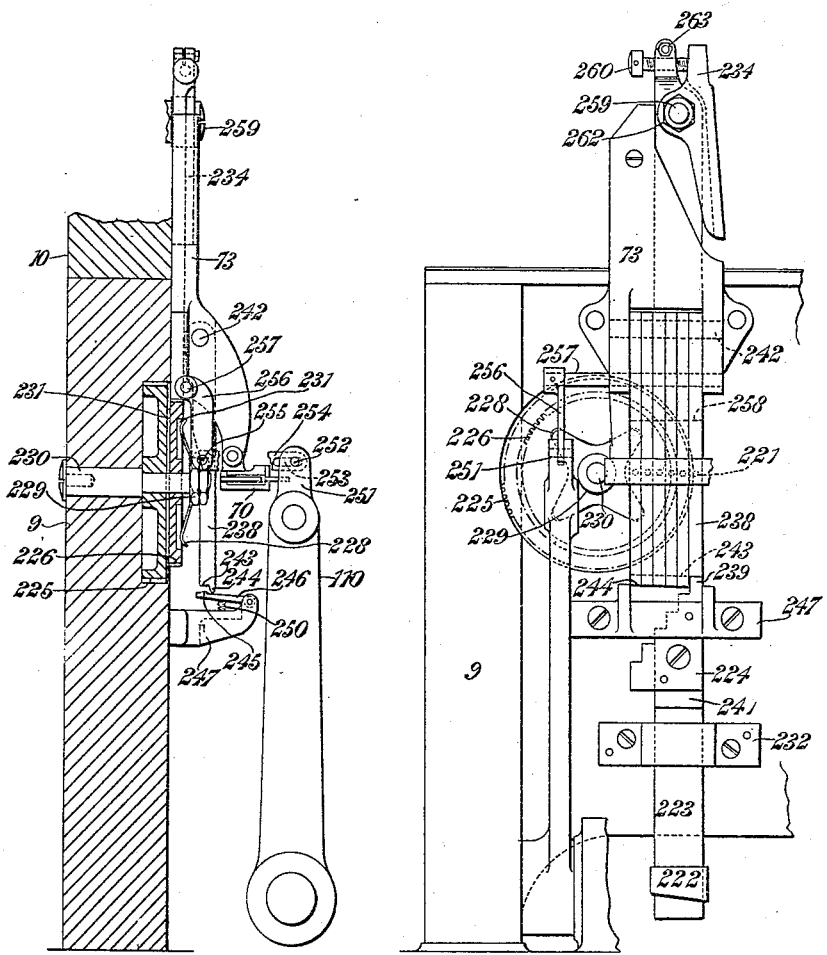

W. G. WHITE.
TYPE CASTING AND COMPOSING MACHINE.
APPLICATION FILED SEPT. 17, 1906.
943,612. Patented Dec. 14, 1909.
24 SHEETS—SHEET 21.
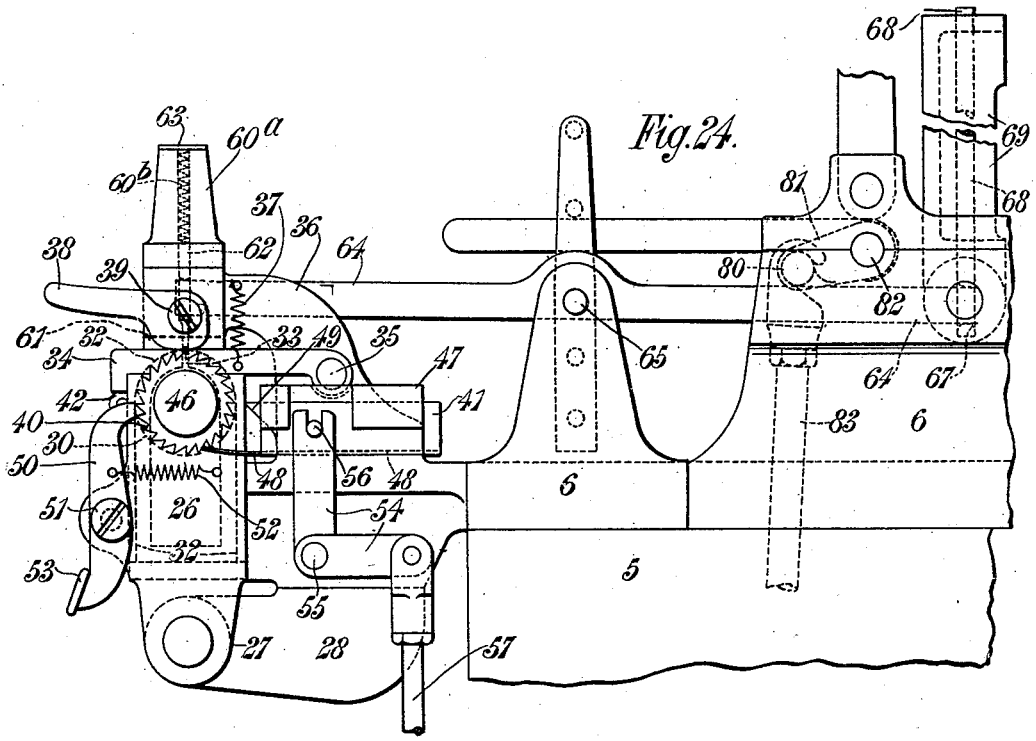
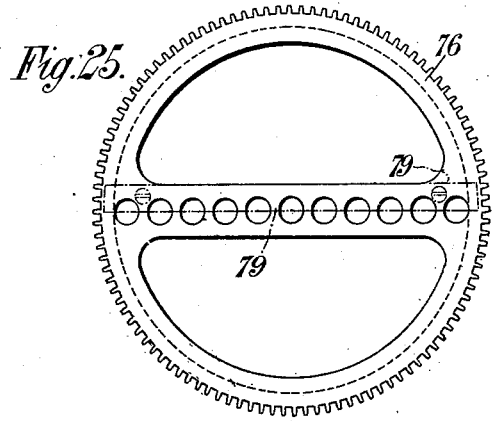
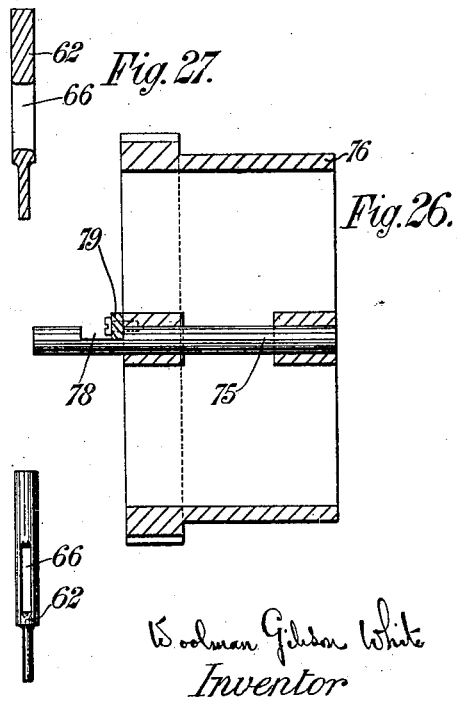

W. G. WHITE.
TYPE CASTING AND COMPOSING MACHINE.
APPLICATION FILED SEPT. 17, 1906.
943,612.
Patented Dec. 14, 1909.
24 SHEETS—SHEET 22.
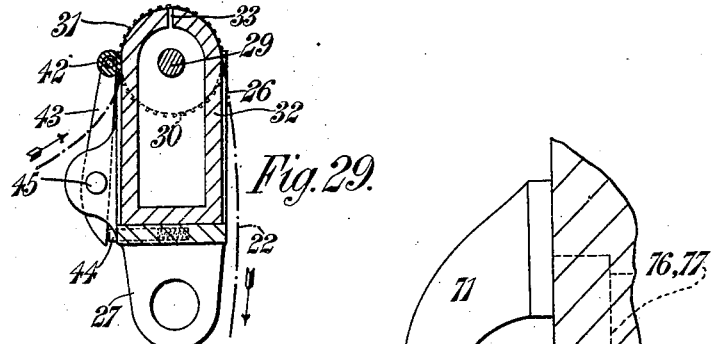
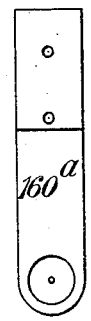
Fig. 31.
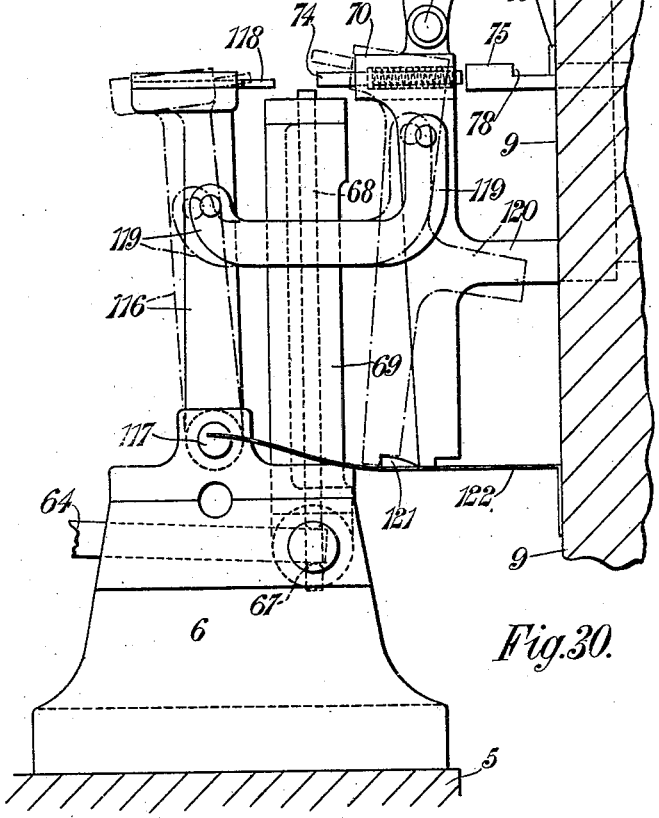
Fig. 30.
Fig. 32.
Witnesses
Henry Hart.
Woolman Gibson White
Inventor
per Chas Skavaroffe
Attorney W. G. WHITE.
TYPE CASTING AND COMPOSING MACHINE.
APPLICATION FILED SEPT. 17, 1906.

943,612.

Patented Dec. 14, 1909.
24 SHEETS—SHEET 23.

Witnesses
Henry Hart.
B Sutherland Polmier

Woolman Gibson White
Inventor
per Chas S Woodroffe
Attorney

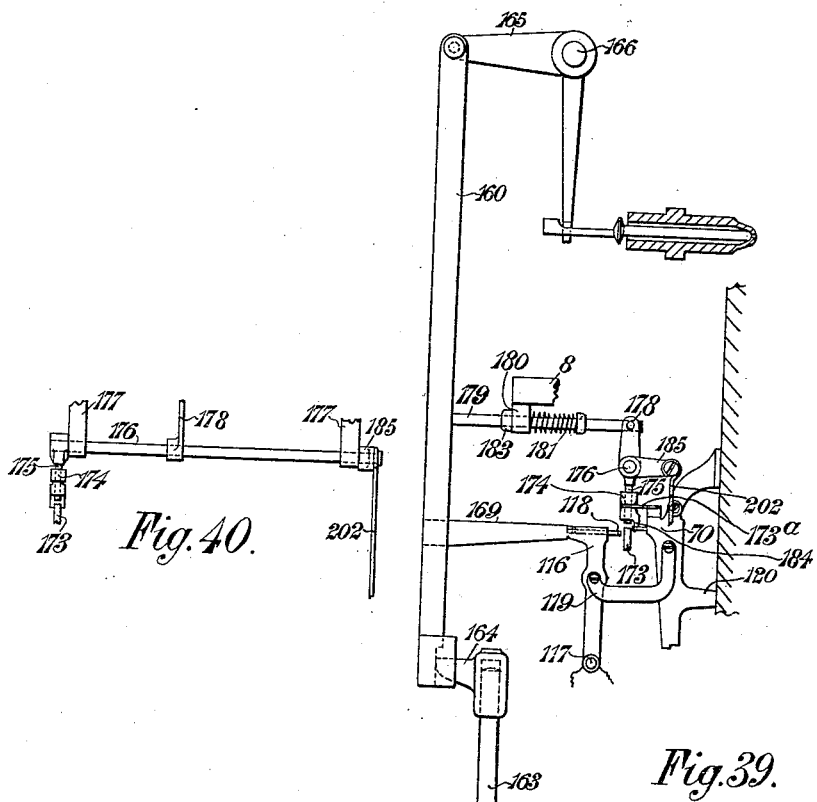
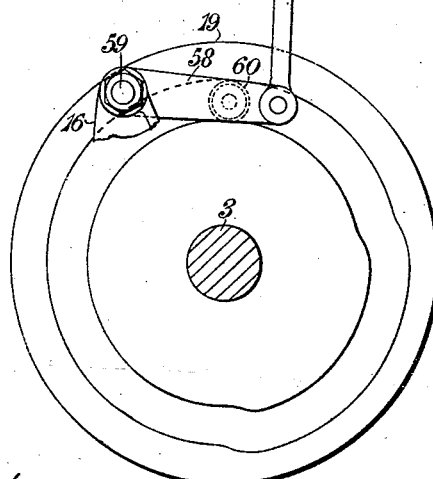

UNITED STATES PATENT OFFICE.

WOOLMAN GIBSON WHITE, OF WASHINGTON, DISTRICT OF COLUMBIA, ASSIGNOR TO LINOTYPE AND MACHINERY LIMITED, OF LONDON, ENGLAND.

TYPE CASTING AND COMPOSING MACHINE.

943,612.  Specification of Letters Patent. Patented Dec. 14, 1909.

Application filed September 17, 1906. Serial No. 335,004.

*To all whom it may concern:*

Be it known that I, WOOLMAN GIBSON WHITE, residing at 415 B street northeast, Washington, District of Columbia, in the United States of America, have invented certain new and useful Improvements in Type Casting and Composing Machines; and I do hereby declare the following to be a full, clear, and exact description of the invention, such as will enable others skilled in the art to which it appertains to make and use the same.

The present invention relates to improvements on the type casting and composing machine described in the specification of Letters Patent 533848, February 5th, 1895.

Figure 2C:
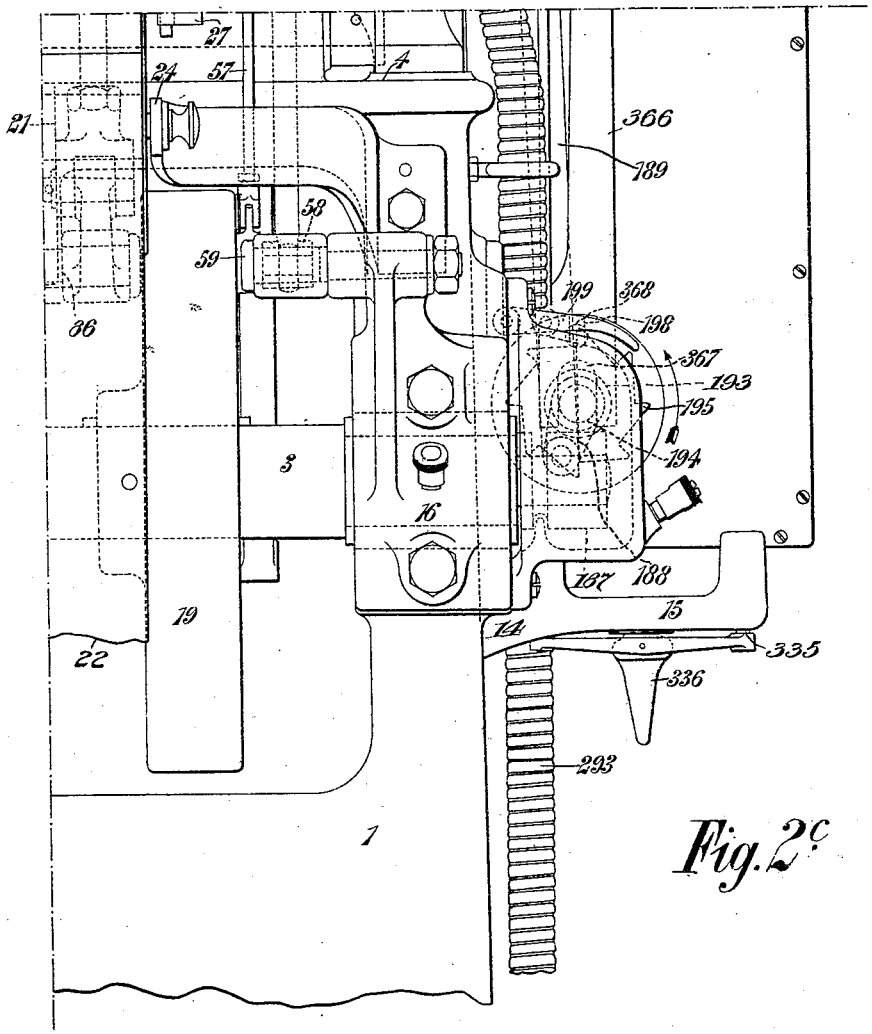
Figure 16:
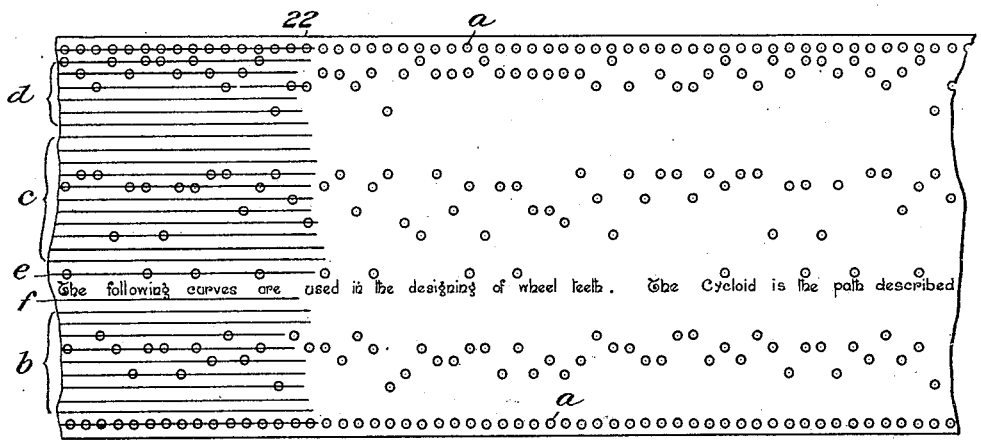
Figure 18:
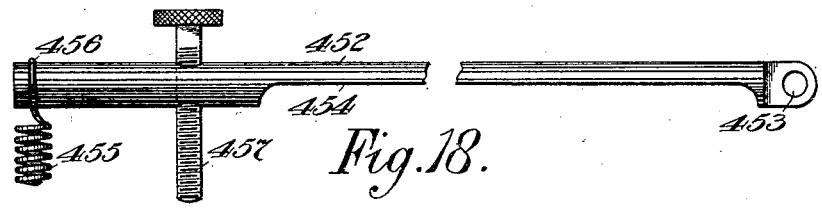
Figure 19:
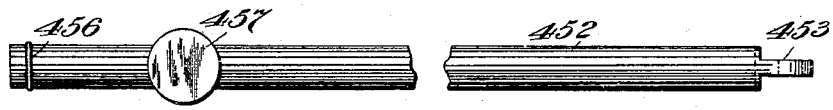
Figure 23:
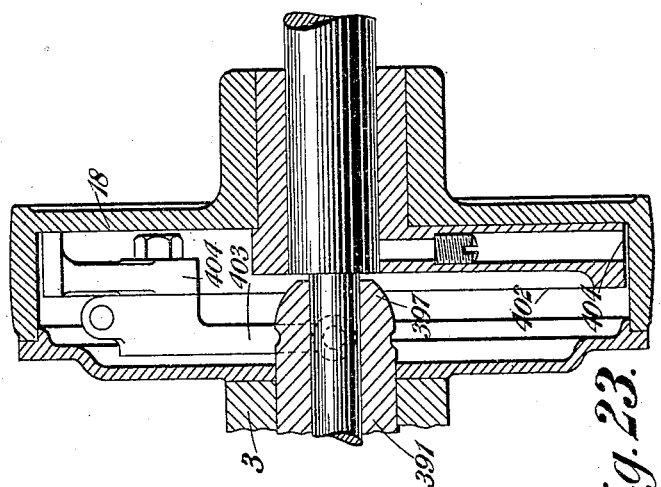
Figure 17:
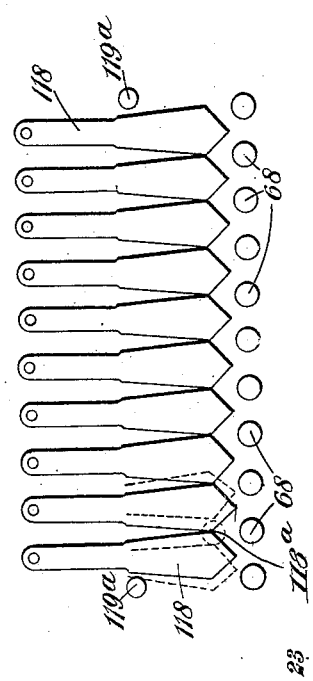
Figure 22:
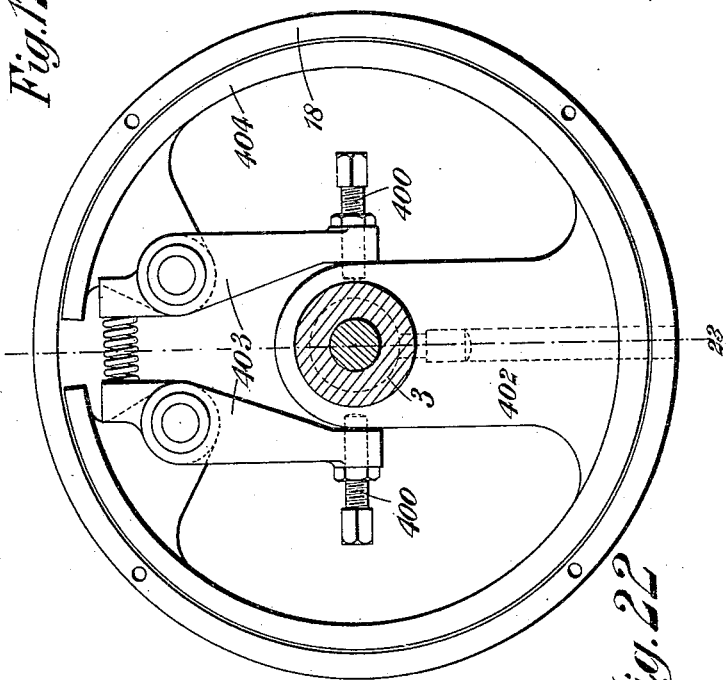
Figure 33:
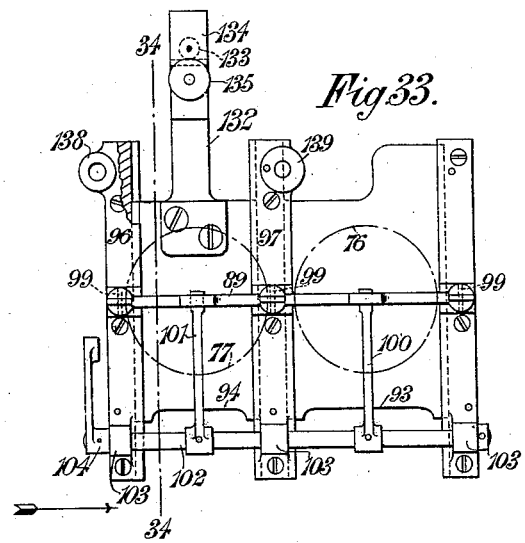
Figure 34:
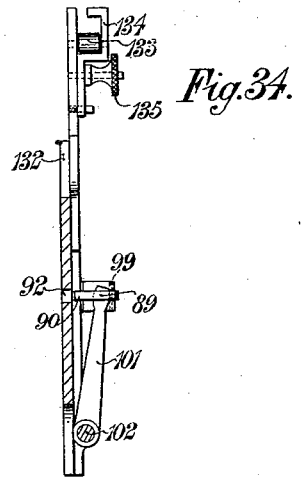
Figure 35:
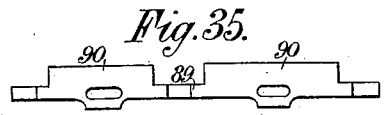
Figures 36, 37:
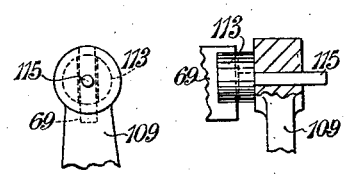
Figure 38:
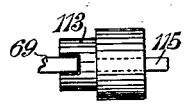
Figure 41:
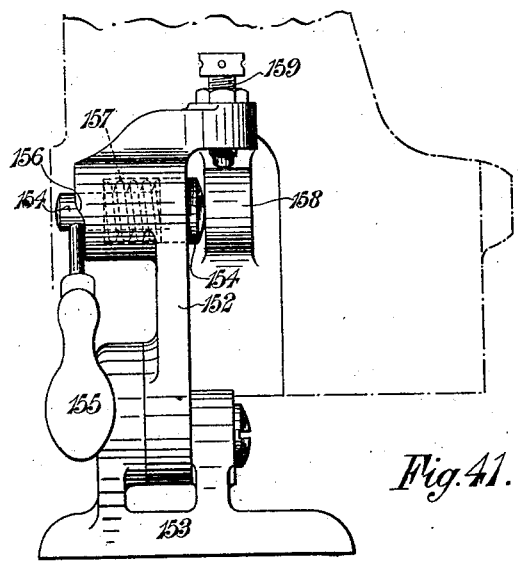
Figure 42:
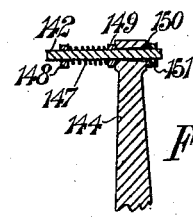

Referring to the accompanying drawings: Figures 1 and 1ª are respectively the left and right hand halves of a plan: Figs. 2, 2ª, 2ᵇ and 2ᶜ together form a rear elevation: Figs. 3, 3ª, 3ᵇ and 3ᶜ together form a front elevation: Figs. 4, 4ª and 4ᵇ together form a side elevation from the left of Figs. 1 and 3: Figs. 5 and 5ª are respectively the left and right hand halves of a front elevation, of the mold adjusting mechanism: Figs. 6 and 6ª are respectively plan views of the left and right hand halves of the mold adjusting mechanism: Fig. 7, a section on the line 7—7 of Fig. 5ᵇ: Fig. 8, a section on the line 8—8 of Fig. 6: Fig. 9, a plan of the type-hook: Fig. 10, a front elevation, Fig. 11 a plan, and Fig. 12 a side elevation of the line measuring device: Fig. 13, a front elevation, Fig. 14 a plan, and Fig. 15 a side elevation of the automatic clutch: Fig. 16, a plan of a piece of the controller: Fig. 17 is a detail plan of the automatic safety device for the wheel pins: Fig. 18, a plan and Fig. 19 a front elevation of the type-retainer: Fig. 20, a side elevation, and Fig. 21 a rear elevation of part of the mold adjusting mechanism: Fig. 22, a side elevation of the driving pulley and Fig. 23 a section on line 23—23 of Fig. 22: Fig. 24, a side elevation from the left of the pin selecting mechanism, and parts in immediate connection therewith: Fig. 25, a rear elevation and Fig. 26, a section of one of the coördinate wheels: Fig. 27, a section and Fig. 28, a front elevation of one of the selecting pins: Fig. 29, a sectional elevation of the bridge piece and the pinching roller: Fig. 30, a side elevation from the left of the rocking frame and intermediate pin frame: Fig. 31, a rear elevation and Fig. 32, a side elevation from the left of the spoon plate which is interposed between the metal-pot mouth and the mold. Figs. 33 to 38 inclusive are details of the slides and their actuating mechanism for operating the matrix carrier: Fig. 39 is a detached side elevation of the mechanism for actuating the choker, taken from the left of the machine: Fig. 40 is a rear elevation of a part of Fig. 39; Fig. 41 is an enlarged detail of Fig. 39; Fig. 42 is a longitudinal section of the impression hammer.

*Machine frame.*—This is illustrated in Figs. 1 to 4. It consists of a principal and vertical piece 1 having half bearings 2, 2 for the main shaft 3; a flat table 4 and a superposed table 5 to support the controller feed frame 6; two standards 7, 7; a shelf 8 carried by the said standards; a vertical front plate 9 to receive the wheels, standing upon the table 4 and bolted to the vertical edges of the standards 7, 7 which are provided for this purpose; and a part 10 which fits upon the top of the plate 9, the latter being as thick as the cradle 10 is wide. The plate 9 and part 10 are intentionally separate from each other, principally because of the amount of machining the part 10 has to undergo, and also, because of the number and importance of the organs which it carries. 11 is a bracket bolted to the plate 9 to carry the metal pot. 12 is a bracket bolted to the edges of the plate 9 and part 10 to carry the galley mechanism, one bolt serving to hold the respective end of the part 10 to the plate 9. The bracket 13 is bolted to the bracket 12 to carry the leading device and other organs also, *e. g.*, a portion of the galley mechanism. Bracket 14 is bolted to the vertical piece 1 to support the galley and to carry the spring box. 21 is a bracket likewise bolted to the piece 1 to provide the fulcrum of the lever that works the coördinate wheels.

*Controller.* (Fig. 16.)—The holes in the improved controller are made along imaginary parallel lines (indicated by the broken lines at the left-hand end of the figure) extending lengthwise of it. These holes were made by vertically acting punches actuated through interponents made to stand over them at the required moment. These punches are not large in diameter and were arranged so close together, that an interponent would frequently, especially if it had a little play, strike the next punch as well as the one it was intended to strike. To prevent this, the punches of the present invention are set farther apart than heretofore, with the result that the rows of perforations in the controller are likewise wider apart than in the previous patent. $a$, $a$ are the the feed holes; $b$, a group of nine rows of character holes to coöperate with one coordinate wheel of the type casting machines and $c$, a second group, but of eleven rows, of character holes to coöperate with the other coördinate wheel; $d$, a group of six rows for justification; $e$, a row to indicate where the spaces occur in the line of composed matter and which start the justifier, and $f$ a row of holes to work the galley of the casting machine—a total of thirty rows. In the previous patent, the rows $e$ and $f$ were next and close to the rows $a$ respectively, thereby weakening both sides of the controller with the result that it was frequently torn. According to the present invention, they are arranged along the middle of the controller. $g$ is the printed record of the composition and is between the rows of holes $e$ and $f$.

*Driving mechanism.* (See Figs. $2^b$, $2^c$, $3^b$, $3^c$ and $4^b$.)—The main shaft 3 has one end turning in half bearing 2 and cap 16 while the opposite end turns in a bearing 17 similarly capped on and in the piece 1. The extreme outer end of this shaft turns in a bearing carried by the bracket 14 already mentioned. 18 is the driving pulley. The shaft 3 is, according to the present invention, parallel with the front of the machine and the cams on it are at right angles with the front. All the grooves of these cams are apportioned between two cam disks 19 and 20, some of the said grooves being in one of the cams, say cam 19, and the remainder in the other cam, say cam 20, the advantage of this apportioning being that the wearing out of one cam groove puts only the respective disk out of use.

*Controller feed.* (See Figs. 1 to $2^c$ and 4 to $4^b$.)—The controller 22 is wound by the machine off a reel 23 mounted to turn freely in a pair of brackets 24 bolted to the main piece 1. 25 is a guide rod carried by the brackets 24, 24, and so positioned thereon as to make the ascent of the controller to the feed nearly vertical in order that the controller may be in contact with as near a half circle as possible (*i. e.*, with as many pairs of feed pins as possible) of the controller feed roller. 26 is a piece pivoted through its two lugs 27, 27, to a bracket 28 fast to the table 5. 29 is a shaft turning in bearings in the two upstanding ends of the piece 26 and having fast on it, the two feed disks 30, 30, furnished with the feed pins 31 which engage in the feed holes in the controller. 32 is a bridge-shaped piece bolted to piece 26 and providing a semi-circular path for the controller, as clearly shown in Fig. 29. To improve the contact between the controller and the bridge piece 32, there is provided a friction roller 42 turning freely in the top ends of a pair of arms 43, 43, pivoted at 45 on two lugs on the upstanding ends of piece 26. The controller is lightly pinched between the roller 42 and the bridge piece by a spring-actuated push pin 44 Fig. 29 working in sockets in the piece 26 against the bottom end of the respective arm 43. The top of the bridge piece 32 has a central row of holes 33 for the selecting pins (described farther on) to drop into and through. The object of pivoting piece 26 on bracket 28 is to facilitate the engagement of the end of the controller with the disks or pin wheels 30, 30, by allowing it to be swung down on the said pivots to the rear. It is held up in working position by a latch 34 pivoted at 35 on a bracket 36 fast to the table 5. The latch 34 is released from 26 by a spring 37 pulling from a fixed point on 36 and is engaged with the piece 26 after the latter has been swung up into working position by a finger cam 38 pivoted at 39 on the bracket 36. When a fresh controller has to be mounted, or the one in the machine has, say, to be moved back, the shaft 29 is moved in the respective direction by a milled head 46 fast on the outer end of the said shaft. 40 is a ratchet wheel on one outer end of the shaft 29 for feeding the controller by a circular step-by-step motion. This motion is communicated to it by a slide 41 reciprocating in a bridge-shaped guide 47 fast on the frame 6. The slide 41 is cut out underneath to receive the spring finger 48 which is fast to it. 49 is a nose beveled underneath and projecting from the same end of the slide 41 as the finger 48, above the finger 48 but not so far as it in the direction of the ratchet wheel 40, as clearly shown in Fig. 24. When the slide 41 is moved up to the wheel 40, the finger 48 engages a tooth and turns the wheel 40 for a distance equal to the pitch of the feed holes in the controller. The nose 49 follows on and engages between the pair of teeth opposite it thereby preventing the wheel 40 being turned too far. After the nose 49 has engaged, the spring finger 48 springs outward and lies against the nose of the tooth that it had pushed. The return motion of the slide 41 would tend therefore to make the finger 48 turn the wheel 40 back again, but it is prevented by a locking pawl 50 pivoted at 51 on one of the lugs that furnish a fulcrum for the arms 43 and kept in engagement with the wheel 40 by a spring 52 on the piece 26. The pawl 50 carries a thumb piece 53 by which it can be disengaged from the wheel 40 when it is desired to turn the shaft 29 by the milled head 46. It may sometimes be desirable to turn the said shaft by hand at a time when the pins 62 (see next section) are engaged with the controller. The device to meet this contingency is described farther on in connection with the part 80. 54 is a bell-crank lever fulcrumed at 55 on the frame 6 and connecting with the slide 41 by a slot-and-pin device 56. 57 is a link from the lever 54 to a lever 58 fulcrumed at 59 on the cap piece 16 and engaging by roller 60 in cam groove (not delineated) in the cam 19. The link 57 is adjustable for length to regulate exactly the feeding motion of the nose 49.

*Pin selecting device.* (See Figs. 1 to 2ª, 4ª, 24 and 27 to 30.)—The function of this device is to select the pins that are required to act on the coördinate wheels and the steps that shall adjust the mold for set width. On the bracket 36 already mentioned, is fixed the bridge piece 60ª and to the under side of it, the plate 61, the two, 60ª and 61, forming a guide for the selecting pins 62 of which there are 27. These pins are arranged in two sets as in the previous patent—those of each set coöperating only with the respective wheel. There is a depressing spring (not shown) resilient in each pin socket in 60ª between the head of the respective pin 62 and a closing plate 63. 64, 64 are the same number of levers fulcrumed at 65 on the piece 6. Each lever engages with its pin 62 by having its nose passed through a slot 66, a pin being thickened for the major part of its length to be massive enough to have the slot 66 and to have top area enough for the depressing spring to bear on. The opposite end of a lever 64 engages in a similar slot 67 in the bottom end of a pin 68 guided top and bottom in the rocking frame 69 to be described farther on. 70 is a bar pivoted through its lugs to a pair of brackets 71, 72 by a pivot 71ª. 71 is fast to front plate 9 and 72 to a bracket 73 (described farther on) fast to the said plate 9. The object of the pivoting of 70 will be described farther on. The bar 70, Fig. 30, carries the like quantity less one (being the galley connection) of intermediate pins 74 working in stopped-end bores in the bar having returning springs working between the right hand—looking at Fig. 4—(or front) end of the bore and shoulders on the respective pins. The pins 74 are normally alined with, and twenty of them actually opposite, the respective wheel pins 75. The latter are apportioned between the two wheels 76, 77, turning in a respective bearing in the front plate 9 flush with each face of it. Wheel 76 has 11 pins and wheel 77 has 9 pins, these being the numbers of pins in the respective wheels of the machine for making the controller 22, and which machine is described in the before-mentioned application Serial Number 277878. Each pin 75 has a slot 78 in which engages a plate 79 fast to the respective wheel, to limit the motion of pin 75.

As many of the levers 64 as have their selecting pins 62 passed into and through the controller 22 by the respective springs 60ᵇ in the bridge piece 60ª, are returned by a rod 80 carried by a pair of arms 81, 81 (one at each end of it) and both fulcrumed at 82 on the frame 6. This rod 80, being situated between the fulcrum 65 of the levers 64 and their outer or front ends, is pulled down to return the actuated levers 64, by a link 83 adjustable for length and engaging with a stud 84 on a lever 85 fulcrumed at 86 on the bracket 21. Because the lever 85 has another and longer throw than is necessary to actuate the link 83, there is a lost motion between the stud 84 and the link 83 occasioned by the slot 87. The lever 85 is rocked by a groove (not shown) in cam 19 through a roller 88. The rod 80 stands in its highest position with a clearance between it and the levers 64 to allow the pins 62 to come down upon the controller 22 and the respective ones to pass through the perforations to raise the rocking frame pins 68; and its descent is enough to lift the noses of all the pins 62 clear of the controller so that the latter can travel forward, and also to store up energy in the depressing springs, by compressing them.

The rocking frame 69 must first be rocked to the rear to return the wheel pins 75 that had been projected. This return is effected by a bar 89 having two projections 90, 90, to engage in the slots 91, 92, in the slides 93, 94, that actuate the matrix carrier. The bar 89 has three guides 95 fast to the gibs 96, 97, 98, that guide the slides 93, 94. 99 is a stop pin through each guide 95 in front of the bar 89. The latter is connected by two arms 100, 101, fast on a rock shaft 102 turning in bearings 103 on the gibs 96, 97, 98, and having a half-crank 104 fast on its outer end. 105 being the connecting rod from the half crank 104 to the rocking frame 69 at 106ª. The present invention introduces two improvements in this part of the machine. According to the present invention, the projections 90, 90 follow the wheel pins closely and vice versa so that the slides 93, 94 are always engaged by either wheel pins or projections. The trifling clearance between them need not be noticed. It will be noticed that the wheels 76, 77 of the present invention, have not to wait for any rock back of the frame 69 but can begin to turn at once. The rod 105 has a cushioning spring 106, a lost motion device 107 and a longitudinal adjustment 108. Looking at Fig. 4ª, the projections 90, 90, are just about to return the wheel pins, the rod 105 now pulling positively. The pull will be equal to the backward movement of the frame 69 (less than half the full rock of the latter). The full rock of the frame 69 forward will be too much to disengage the projections 90, 90, from the slots 91, 92 (and besides, the stops 99, 99 limit the respective motion of them) so that the rod 105 first pushes the projections out and then cushions from the time it has got the bar 89 up to the stops 99, 99.

The frame 69 is rocked by the means next described and it is specially constructed to work smoothly therewith. 109, 110—Figs. 2 and 2ª—are two rocking levers. They are both fast on a rock shaft 111 turning in bearings in the table 5, and stand in the same plane as the rocking frame 69. The shaft 111 takes its motion from a lever 112 fast on it and having a roller on the other end of it that engages in a cam groove (not delineated) in the cam 20. Because the axes of the rocking frame 69 and the levers 109, 110, do not coincide in any way, the connection between the two levers 109, 110 and the said rocking frame must be self-adjusting. It therefore consists of jaws 113, 114 which embrace the rocking frame 69 and a pin 115 (being part of the respective jaws) that turns in the head of the respective lever.

*Automatic safety device to prevent more than the normal two wheel pins being pushed into the matrix carrier slides.* (See Figs. 4ᵇ, 17 and 30.)—This pushing might occur when the controller has wholly passed through the feeder, or with a controller that is torn across the respective row of perforations, in either of which cases, there would be more than two pins 62 set down. 116 is a frame fulcrumed at 117 in the feed frame 6. The top of it carries in plan two series of pivoted dogs 118—one series of ten for one wheel and one series of eight for the other wheel, the two series being alined with each other. Only the series of ten is shown in Fig. 17. 119ª is a stop pin at each end of a series to prevent the series being spread open anywhere by any of the pins 68 wider than suffices to let one pin 68—the one for that series—pass the angles 118ᵈ on the noses of two adjacent dogs, as indicated by the dotted lines in Fig. 17, so that if there were an excess pin 68 (and there would be one if an excess pin 62 were down) it could not pass the angles, and the frame 116 would be rocked back, *i. e.*, to the left of Fig. 17, by the backward motion which the rocking frame 69 makes to withdraw the previously set wheel pins 75. But the frame 116 is connected by a link 119 to a depending piece 120 on the intermediate bar 70 which is pivoted at 71ª for the purpose of this automatic safety device, so that the bank of pins 74 is rocked up into the position indicated by the dotted lines in Fig. 30 by the said backward motion of the frame 69 whenever there is even one excess pin 62 down and held out of reach of the pins 68 which the frame 69 might present for the purpose, at the next rock forward to push them toward the respective wheel pins 75 the bank of pins 74 being so held out of reach by a detent 121 on a spring bar 122 fast to the front plate 9, and which detent engages in front of the bottom end of the piece 120 as soon as the said bank of pins 74 has been rocked up. This device prevents any more wheel pins being engaged in the slots 91, 92, in the matrix carrier slides, and also prevents any of the step pieces (described farther on) being actuated. The operator must then withdraw the detent 121 from the piece 120, whereupon the bar 70 swings back by its own weight into its normal position, the projection engaging the front plate 9 when it has reached that position.

*Turning the wheels.* (See Figs. 2–2ᶜ and 4–4ᵇ.)—The lever 85 already described is connected by an adjustable (for length) link 123 to a rack 124 cut on both of its edges. This rack works in a groove 124ª cut in the rear face of the front plate 9 and is arranged between the wheels 76, 77 so as to engage with them both on their peripheries, being toothed on both edges therefore turning each one directly. Each wheel is reciprocated through a 90° arc as before. 125, 126, are two plates fast to the plate 9. They serve to keep the rack 124 and the two wheels 76, 76 in position. 127, 128, are two further plates opposite to the others and serving a like purpose.

*Setting the matrix carrier and plate.* (See Figs. 1, 1ª, 3 to 3ᶜ and 33 to 38 inclusive.)—This is effected from the wheels 76, 77, through a pair of slides 93, 94, but by improved connections, the practical advantages of which are (*a*) more direct action, (*b*) less risk of play, (*c*) lightness of moving parts. This last detail is one of great importance in a high speed machine. 129, 129 are the matrices mounted as heretofore in the matrix plate 130 which reciprocates vertically in grooves in the matrix carrier 131. The matrix plate 130 is reciprocated vertically by a link 132 made fast by its bottom end to the top of the slide 94. The top end of it carries a hook 134 which fits over a ledge on the bottom edge of the matrix plate 130 for detachability, but the hook carries an antifriction roller 133 upon which the plate 130 rests and travels. This roller obviates the friction of the previous device in which its pin 14 was always grinding against either the top or bottom edge of its slot 15. Further, the hook 134 can be moved away from the link 132 by the thumb screw 135 to clear the ledge on the mtarix plate. The horizontal motion of the matrix plate is communicated to it through the carrier 131 from the other slide 93. The novel connections are a bell-crank lever 136 and a link 137. It is the lever 136 that does the reriprocating, the link 137 serving to support the carrier 131 on the opposite side and make its motion horizontal. The link 137 and the lever 136 are fulcrumed at the points 138 and 139 on the respective gibs 96 and 97. The connection between the lever 136 and the slide 93 is by means of a block 140 pivoted on the end of the lever 136 and sliding in a slot 141 in the slide 93 and positioned in its top right hand side (because the bell crank lever 136 is fulcrumed on the top left hand side) and at right angles to the motion of the slide 93. The opposite end of this lever 136 is correspondingly pivotally connected to the respective side of the carrier 131. The arcual motion of the carrier so far as it brings it below the ideal horizontal line is compensated for by adjustment of the motion of the vertical slide 94, which yields one way or the other so as to move the matrix carrier in the opposite direction to the arcual rise or fall given to the matrix plate 130 by the horizontal slide 93.

*Matrix hammer.* (See Figs. 3 to 4$^b$.)— According to the present invention the impression pin and pot nipple are actuated separately each by its own mechanism. 142 is the impression pin. The disk 19 has a special cam groove (not shown) which receives a roller 143 on the end of a lever 144 fulcrumed at 145 in a bracket piece 146 bolted on the machine frame. The impression pin 142 can swivel in the top of the lever 144; 147 is a cushioning spring between a nut 148 and a washer 149, the front face of the latter being convex and ending in a concave setting in the lever. 150, 151 are a pair of nuts on the front end of the pin 142. The action of this pin is as follows:—The arm 144 presses it up against the matrix pin and as soon as the matrix makes contact with the mold, the spring 147 compresses and remains compressed until the type is cast. After the lever 144 is moved back from the matrix the spring 147 returns the pin 142 to its normal horizontal position. But the spring 147 has a cushioning effect in respect of the pressure pin 142 on the matrix, inasmuch as it allows the lever 144 to move up toward the matrix after the latter has been forced up to the face of the mold. The two nuts 150, 151 are to adjust the pin 142 to give the necessary clearance between it and the matrix pin when the hammer 142 is back. The head of the impression pin 142 is slightly concave and the head of the matrix pin is slightly convex as before, the object being to maintain an approximate alinement between the axes of the two pins. The advantage of the compression of the spring will be apparent when it is considered that out of a number of matrix pins there must be variations in their normal projections. The present invention assumes the existence of unequal projections of the matrix pins and the compression spring provides for practically equal pressure being exerted by the lever on each one in turn, in spite of such inequality, the inequality being compensated for by the strong resilience of the spring 147 so that this compressibility under the resistance of the mold will make this felt in the said spring through the matrix pin.

*Metal pot.* (See Figs. 1, 1$^a$, 2, 2$^a$, 4 and 4$^a$.)—The metal pot 460 and the lateral extension 461 fast to it and which latter carries the usual nipple 162 through which the metal is injected into the mold, do not form any part of the present invention and for that reason the details of their construction are not specified. They are adapted to turn about a suitable pivot coincident with the vertical axis of the pot, in either direction, to respectively make the said nipple register metal-tight with the mold or to give access to the latter, as heretofore. The present invention is limited in respect of this part of the invention, to the devices for locking the nipple 162 up to the mold. 152 is an arm pivoted by its foot in a bracket piece 153 fast upon the top of the shelf 8. The top end of the arm 152 forms a socket or bearing for a pin 154 which is provided with a handle 155. 156 is a cam surface on the end of the socket or bearing and up which the handle 155 rides to withdraw the pin 154 against the resilience of the spring 157. When the handle 155 is down, this spring protrudes the head of the pin 154 making it bear against a lug 158 fast upon the nipple casting of the metal pot. The arm 152 has an overhanging projection which is provided with a set screw 159 adapted to bear on top side of lug 158 for the purpose of preventing any motion in the nipple, which might otherwise be pushed out of alinement with the mold by the upward thrust of the push rod 160 described farther on. This improvement is important because it preserves alinement of nipple with mold. The reason why the nipple of the pot in existing machines of this type could be sprung up out of alinement was that although the metal pot might be fitted true, yet the distance at which the nipple was held from the pot made it certain that the nipple would be pushed out of alinement more or less by the lever 136. The spring 157 is of known strength and is weaker than the means which hold the mold fixed on the frame of the machine, but is of sufficient strength to keep a tight joint between the nipple and the mold, whereas if a screw were used to protrude the headed pin 154 the operator might sometimes not screw it up far enough and might sometimes screw it too far, but the above-mentioned correlation of strength provides for always an operative pressure being exerted. The handle 155 is swung up to withdraw the headed pin 154 and the lever 152 pulled down by it to clear the path of 158 when the pot and nipple casting have to be swung away out of the casting position. The arm 152 is swung down to allow the metal pot to turn upon the vertical axis out of the casting position, and after the pot has been swung back again into the casting position, it is swung up, this latter motion bringing the headed pin 154 behind the lug 158 and the handle 155 being then down over the cam, the resilience of the spring 157 forces the nipple casting with sufficient force against the back of the mold. $160^a$ is the usual spoon plate to serve as a packing piece between the nipple 162 and the mold and 161 its handle.

*Working the choker.* (See Figs. 4 to $4^b$, 39 and 40.)—The choker is the well-known valve rapidly reciprocated in the port from the metal pot to the nipple, to check the supply of metal from the said pot through the nipple to the mold. It is well known to the users of type casting machines of the class to which that of the present invention belongs, that each change of font necessitates a change in the level of the metal pot and its nipple because the level of the metal port in a mold for any given font differs from that of the metal port in the molds of every other font. It has therefore become the practice to mount the metal pot 460 on a standard as 168 upon which it can be adjusted vertically as by a pair of nuts 167, 167—Fig. $2^b$. But this vertical adjustment must be accompanied by one in the mechanism that reciprocates the choker. According to the present invention, the disk 19 has a special cam groove, $60^a$, which receives the roller 60 on the lever 58 already described. The outer end of the lever 58 has pivotally connected to it a connecting rod 163 working through a guide in parts 4 and 5 and carrying on its top end, a push piece 164 which is vertically adjustable upon the top of the rod 163 to reciprocate the choker properly. Thus, if the adjustment of the metal pot 460 raises it two-thousandths of an inch, the piece 164 is raised the same distance on the rod 163.

*Extension of the influence of the automatic device 116, etc., to prevent a cast when there is the described fault in the controller.* (See Figs. $2-2^c$ and $4-4^b$.)—When the rocking frame 116 is actuated, it exerts a thrust upon the arm 169 fast on the push rod 160 (Fig. 4) and thereby pushes said rod off the push piece 164 so that the choker remains on its seat, it being held there by the spring 170 Fig. 4. 171, 171, are two guard plates fast on the rod 160 (bottom end) one on each side of the push piece 164. They are deep and wide enough not to clear 164 no matter how much the rod 160 may be moved up and down or out or in. After the rod 160 has been pushed off the push piece 164, it is pulled back by a spring 172 into position to be pushed by the push piece 164 during the next cycle of the machine.

*Connection between controller and galley.* (See Figs. $2-2^b$ and 4–6.)—A galley perforation raises a pin 173 in the rocking frame 69. This pin is the one next to the row of nine pins 68 and there are no dogs 118 opposite it in the automatic device already described in order that the half rock of the frame 69 shall not and does not rock up the intermediate pin frame 70. $173^a$ is a spring or slightly flexible arm fast by its heel on the top of the intermediate frame
70. Its nose is forked to straddle a block 174 capable of sliding freely on one arm 175 of a 3-armed crank (the third arm to be dealt with later on). 176 is the crank shaft turning in bearings in two brackets 177 depending from the plate 8. 178 is a second arm of the same crank having a rod 179 pivotally connected to it by a slot-and-pin connection, and sliding in a guide 180 pendent from the plate 8. 181 is the returning spring for the rod 179 resilient between the guide 180 and a collar 182 fast on the rod 179. 183 is a second or stop collar adjustable lengthwise of the rod 179. 184 is a lip on the bottom of the block 174. Thus when a feeler or selecting pin 62 drops into a galley perforation, the pin 173 is raised behind the lip 184 and the next rock forward of the frame 69 engages the crank and slides the rod 179 backward thereby knocking 160 off 164 and consequently preventing the opening of the nozzle port. This prevention should, and normally does, occur only at the end of a line. If, however, the character perforations (two) and the set way dimension perforation (one) in the same transverse line on the controller as the galley perforation is in, are damaged so as to actuate the automatic safety device 116, the extra upraised pins 69 will, through the pivoted frame 116 and the arm 169, knock off the push rod 160, in which case it is not necessary that the pin 173 should knock it off, and it is prevented from so knocking it off by the up rock of the intermediate pin frame 70 making the flexible arm $173^a$ raise the lip 184 out of the path of the pin 173. The pin 173 when raised under normal conditions not only stops a cast as just described but must also start the mechanism that withdraws the line of type from the type race. (N. B. Each rotation of the main shaft causes one type to be cast, trimmed and ejected into the race. The withdrawal of a line occupies one such rotation during which no type is cast.) 185 is the third arm of the crank above mentioned in connection with the shaft 176 and has its outer end pivotally connected to the top end of the rod 202.

According to the present invention the type hook 186 is actuated by a worm 187 on shaft 3 through a worm wheel 193 on the shaft 194, a half-crank 188 thereon, a connecting rod 189, a bell crank 190 fulcrumed at 191 in the bracket 12, and a link 192 that connects with the hook. With reference to the hook 186, it must be pointed out that its motion must be horizontal. The motion of the adjacent end of the bell crank lever 190 is naturally arcual. There are therefore provided the horizontal guide 190ª which is a slot cut in the face of the bracket 12 against which the link-end of the hook 186 slides and the link 192, the screw 192ª of which pivoting the link and the hook together, works in the slot 190ª. (The link 192, bell crank 190 and connecting rod 189 are in the old machine.) This mechanism provides for the hook 186 being driven at regular intervals, but as the hook is under the control of the line perforations in the controller, the front half of the shaft 194 (that is to say the part thereof that carries the half-crank 188) is disconnected from the rear half and placed under the control of the said perforations, by the means next described. Before proceeding to describe these means it should be noted that the hook 186 must move slowly. This desired slowness of motion is effected by arranging that the intermediate shaft 194 shall make only one rotation to eight of the drive shaft 3.

The shaft 194 is in two sections, the severance being between the ratchet wheel 195 and the boss of a cam 196. This boss is slotted radially down its rear face and carries a detent 198 pivoted therein to be rocked into engagement with the ratchet wheel 195 by a spring. This detent presents its top above the boss of the cam. 199 is a pawl adapted to prevent the detent 198 engaging with the wheel 195 and it does so by the following means. It is pivoted upon the fixed bracket 200, is narrowed toward its nose on the side next the detent and carries a stop 201 and has the rod 202 connected to itself at a point between its pivot and the stop 201. Consequently, the rod 202, in its normal position (that is to say, the position corresponding with non-elevation of the pin 173) keeps the detent 198 disengaged from the ratchet wheel 195. It has already been stated that the elevation of the pin 183 rocks up the crank arm 185. This rocking up pulls the rod 202 up and the pawl 199 from behind the top of the detent 198. As soon as the latter is free, a spring (not shown) urges it into engagement with the ratchet wheel 195 to lock the two sections or half shafts together, which it forthwith begins to do, but to insure that this engagement shall be properly effected—it might miss if the rod 202 could be returned as soon as the pin 173 had cleared the lip 184, so prompt is the action of the spring 181—the return of the rod 202 is delayed by a fourth crank arm 203 on the shaft 176 and a detent 204 on a spring arm 205 fast on the plate 9. The resilience of this arm 205 holds the detent 204 up to the crank arm 203, and as soon as the pin 173 has rocked the arm 203 past the detent 204, the latter springs up and locks the shaft 176 and the connected parts against the returning power of the spring 181. This locking must be undone to allow the rod 202 to return. For that purpose, the jaw piece 113 in rocking lever 109, carries a pin 206 that misses the detent 204 as it—the lever 109—rocks forward, but engages with the cam 207 on the detent 204 as it rocks back, thereby depressing the detent, whereupon the spring 181 is released and the connected parts are returned by it to their normal position, the arm 203 engaging above the detent 204. The pin 206 rocks forward for a short distance on to the spring arm 205 and backward for a short distance on to the flat top of said detent.

The return to its normal or central position of the lever 109 does not effect the depression of the detent 204 because it takes the pin only as far as the foot of the cam; its subsequent rearward motion toward the automatic safety device 116 takes it up the cam, and it is this subsequence of motion that confers the delay necessary to secure the above-mentioned engagement. The normal or central position of the pin 206 with reference to the cam 207 is shown in Fig. 4, the pin being really vertically clear of the cam by a short distance to prevent it engaging the spring arm as it, the pin, rocks forward. The half crank 188 is also set a little to the rear of the center. This permits of the hook 186 having the position of rest so that its first motion is into the cavity 208 in the cross plate 209 which motion is followed by its engagement behind the line. The hook 186 does not enter the cavity 208 until the cross plate 209 has completed its downstroke, but the hook 186 must have got out of the way of the cross plate 209 before the latter gets up to the race 210. This is why the position of rest of the hook 186 is one of partial projection into the path of the cross plate 209, but the presence of the cavity 208 (which is of suitable shape and continued far enough down for the purpose) provides for the said plate clearing the projecting part of the hook.

The two half shafts having been locked together as a consequence of the engagement of feeler pin and galley hole, the nose of hook 186 is moved into the cavity 208 and raised to the level of the race by the spring 211 which is bearing upon the high parts 212 (on the cradle 10) and consequently another compression of the spring 211 presents the hook 186 behind the last type and this presentation coincides with the half crank reaching its bottom dead center. The withdrawing motion then begins, and ends when the hook clears the end of the line-of-type-blank-depressors 213, the pin of crank 188 being at the same moment at the top dead center. The return motion of the hook then begins, but as the type are gathering in the next-to-the-mold end of the race 210 it is evident that the hook has not a clear path through the full length of that race. It is therefore driven back through the race as far as the port 214. While the hook 186 was withdrawing the line of type, the hooked end of the spring 211 moved with the body of the hook in the direction of the fixed cam piece 215 and engaged with the top edge thereof to prevent the hook dropping into the said port 214, it being noticeable that the top contour of the cam piece 215 is shaped to exert an upward pressure. To come back again to the return motion of the hook 186. By the time it gets up to the port 214, the hooked end of the spring 211 engages with the bottom contour of the cam piece 215 and this contour is so shaped as to depress the hooked end of the spring 211 and to consequently pull the hook 186 absolutely into the port 214 which is beveled to facilitate its descent through the port into the channel within the channel plate 216, and by the time the hook 186 gets into its original position of partial projection into the cavity 208, the half crank 188 has got into its original position just short of the bottom dead center, whereupon the detent 198 is withdrawn from the ratchet wheel 195 by riding upon the cam surface of the pawl 199 and abutting against the stop 201 on the same.

The consideration of the connection between the controller and the galley has led the attention away from following the functions of the machine in their logical order. The next organ to be described should be the mold, but a few particulars of the construction of the cradle 10 are desirable before dealing with the mold. The cradle 10 is a casting of various top levels and hollow throughout from top to bottom. There must be found in it a seating for the cross plate 270 which is L-shaped in horizontal section. There must also be found spaces for some levers. All these spaces might have been cored out but the machining of their surfaces would have been very expensive. To get over this difficulty the cradle is made with a side opening which receives a gib 217.

*Mold.* (See Figs. 5 and 6.)—In the Patent 533848 the bottom section was slotted out to make room for the lever 70—see Fig. 7 of the specification—to work in, and the top and bottom sections were held together by a corner piece 208 let into the two. Now, the lever 70 is abolished and the slot with it; the two sections are held together by an end plate 218, through which the reduced shank of the middle or ejecting or set width section 237 works. The front plate 219 is similar to that employed in accordance with the previous patent. The end plate 218 is not too thick to prevent it springing when the mold comes to be locked. The front plate 219 is now screwed and doweled to the bottom block or section 279 to endow the edges of the matrix seating 220 with an alining function on the matrix, there being a little play between the screws through it into the top block or section (no doweling) to compensate for locking. The front plate 219 overlaps the cross slide a little to serve as a guide or support for its travel, while the gib 217 does the like for it on the other edge.

*Adjusting the mold for set way dimension of type.* (See Figs. 2, 5, 6, 20 and 21.)— All the types are divided into several widths. There are six pins 221 on the left hand side of the rocker frame 69, but they do not correspond with any wheel pins. These six pins with the stop 222 on the bar 223 that has fast to it the six-step block 224 adjust the mold over the seven set way widths. 225 is a wheel turning on its own bearing in the front plate 9. It is driven by the adjacent wheel 76. 226 is a second wheel loose on the same axis but held to the wheel 225 by an adjustable pressure consisting of a spring 228 compressible by nuts 229 on the axle 230; 231 being a fiber or leather washer on each side of the wheel 226. The rack bar 223 is engaged by the wheel 226. Supposing the machine calls for a one unit type, the wheel 226 will move the rack bar 223 up until the stop 222 on it, contacts with the bottom bearing 232 of the rack bar 223 fast on the front plate 9. The opposite end of the rack 223 works through a guide in bracket 73 already mentioned as fast on the front plate 9 by its bottom end, and by its top end to the cradle 10. It carries the incline 234 and as the last described motion of the rack will be its maximum, the highest point of this incline 234 will engage with a roller 235 on the slide 236 that carries the respective mold blade or set width section 237 and which it pushes into the mold space, far enough to close to a one unit set width. If, on the other hand, the ribbon makes demand for a seven unit space, the right hand pin (looking from the rear of the machine) of the six will be made by the rock of the frame 69 to rock the respective pivoted arm 238 in front of the seven-unit step 239 on the step block 224 on the rack 223. This will stop the upper motion of the rack bar and make it present the maximum of the incline 234 to the roller 235, whereby the blade or section 237 (through the intermediate parts detailed farther on) is held by a suitable returning spring 240 with the mold adjusted to a set width of seven units.

It must be pointed out in connection with the actuation of the rack bar 223, that the stop 222 is adjusted on it to engage with the bearing or stop 232 before the wheel 76 has completed its quarter turn. Thus there is a margin of motion on the wheel which suffices to insure the contact of the stop 222 with the bearing 232, by e. g. preventing rebound, and if the margin of motion should find nothing to do, the wheel 226 simply slips upon the larger one 225. Moreover, it is necessary that the arms 238 should engage properly with the steps on the step block 224. To insure this proper engagement, there is a clearance between the top of the stop 232 and the bottom of the block 224 (or rather of an interposed block 241 forged on the bar 223 to take the shock of contact with the stop 232) which provides for the block 224 being low enough for the arm 238 to swing fairly into the upward paths of the respective steps. The arms 238 are pivoted on 233 at 242. 243 are their engaging noses with the steps of the step block. The motion of the intermediate bar is rapid and an automatic device to prevent the arms 238 rebounding is necessary as well as a special returning device. The detent consists of a nose 244 on each arm 238, a shoulder 245 on a lever 246 pivoted in a bracket 247 fast on the plate 9. 250 is a returning spring for each lever 246 and its shoulder. The special returning device is actuated by the same motion of the rocking frame 69 that actuates the automatic device 116. It consists of an upstanding forked end 251 incorporated with the lever 110 and having the pin 252 engaging in a slot 253 in a link 254 pivoted by its opposite end at 255 to an arm 256 fast on a shaft 257 turning in the bracket 73. 258 is a bail also fast on 257. It is this bail that engages with the rocked arm 238 to return it behind its detent. The object of the slot 253 as compared with a hole is to allow the rocking frame 69 to rock to the front without actuating the bail. The incline 234 is adjustable for each change of font by turning it on the pivot 259 which holds it to the rack bar 223, thereby altering the angle of inclination of said wedge 234 and giving a correspondingly shorter or longer motion to the slide 236 working on a double V or its equivalent upon the machine frame. 260 is a set screw working through the rack bar 223 to change the angle of the wedge 234. 261 is a spring resilient between the bar 223 and the wedge 234 to keep the top of the latter in touch with the set screw 260; and 262 is a nut on the pivot 259 to lock the wedge in adjusted position. 263 is a pinching device to prevent the set screw 260 turning after it has been set.

The practical length of the slide 236 is adjustable to compensate for any shortening of the blade 237 (e. g., by having its nose ground off to make it quite true) by the nut 264 working between the uprights 265, 266, which are parts of the slide 236, said nut having fast to it a screw that engages in the plate or block 267 forked to receive the adjacent end of the piece 268 to which the slide 236 is made fast. After adjustment by the nut 264, the piece 267 is locked to the slide 236 by set screws 269. This adjustability meets also the requirements of a change of font. But the blade 237 has also to eject the type from the mold cavity into the cross slide 270. This is done by the action of the cam 271 on the roller 272 likewise carried by the slide 236 but adjustable in point of length from axis of roller 272 to nose of slide 236 by a device similar to that already described in connection with the nut 264 to compensate for any alteration in the throw of slide 236 caused either by grinding off its nose or by the nut 264. The cam 271 is itself fulcrumed at 272ª between two uprights on the cradle 10. A lug 273 (part of the projection 266 on slide 236) is brought by the pull of the returning spring 240 up against an adjustable stop 274 to prevent the roller 272 battering the contour of the cam 271 or the roller 235 battering the wedge 234. The adjustable stop 274 is a tommy headed screw turning in a bracket screwed to the cradle 10, and provided with a lock nut that bears against the bracket. The tension of the spring 240 is adjustable by means of a screw threaded pin and nuts 275. The cam 271 is worked by a slide 276 the bottom end of which is connected by a link 275ª to the outer end of a cranked lever 277 engaged by a cam groove in the disk 20, the lever 277 having its fulcrum in a bracket 17 which latter is a replica of the bracket 16 already described. The slide 276 works in a guide formed by a groove in the inside face of the front plate 9 in order that its motion may be truly vertical for several reasons—one of which is that there is not room for a connecting rod that has an arcual throw. The connection between the top of the slide 276 and the cam 271 is consequently of the pin and slot type to compensate for the nonthrow motion of the said slide.

*Ejector.* (See Figs. 2, 5, 6, 7 and 8.)— The cross slide 270 is reciprocated partly in the cradle 10 and partly in the gib 217 by its being eccentrically connected by a link 282 to a wheel 281 turning in a bearing in the plate 9 and driven by the coördinate wheel 77. The pull of the link 282 is direct and alined with the length of the slide 270. The object of this reciprocation is to move the type from the ejected position (i. e., the left hand of the mold cavity) to opposite the race 210. When the slide 270 has got high enough for the bottom side of the type on it to be flush with the bottom of the race 210, the pusher 283 pushes it off the slide 270 into the race 210. The slide 270 stands for an interval in its top position and it is during this interval that the following type is cast, for it is evident that the casting cannot take place while the slide 270 is on the move. 284 is a hard steel piece let into the slide 270. It is this piece 284 that is opposite to the mold cavity to close it when the slide 270 is in its top position. The cross slide 270 is L-shaped in plan and has an opening 285 to receive the type, the bottom of which rises to be flush with the bottom of the race 210. The type is pressed down upon the bottom of the opening 285 by a spring actuated nut-adjustable presser 286. 287 is a spring actuated and adjustable detent to prevent a type falling back out of the race 210. This detent has a central cavity into which enters a prolongation 288 of the presser 286, so that the type is always under one or other of the pressers 286 or 287 until the moment that it is in the race 210. The slide 270 carries a knife 289 which cuts off the jet from the type that has just been pushed into the race 210, as it, the slide 270, commences its down stroke to make the opening 285 register with the mold. The type is cast with a jet on it and the type and jet lie in the opening 285 which necessarily extends from front to rear of the slide 270. The dimension of this opening is the full width of the mold block. The rear to the left projecting part of the slide 270 has the opening 285 in it continued to the left to allow of the jet being carried along with its type as the latter is being ejected past the detent 287. When it is so past the detent 287, the jet stands under the knife 289. 290 is a plate fast upon the front of the slide 270 and chamfered in its right edge to coöperate with the front plate 219 in completing the matrix adjuster. 291 is a declined port in the cradle 10 into and down which a cut off jet drops, then down a chute 292 (Fig. 2) and a flexible tube 293 into any convenient removable receptacle.

*Clamping the mold.* (Figs. 5 and 6.)— According to the present invention, the mold is fast to the machine frame, not having any lateral motion. The descent of the slide 276 has a slot 294 the top end of which it brings to bear upon a stud 295 on a lever 296 having a fulcrum at 297 in the bottom end of a vertically reciprocating rod 298 the top of which carries the top clamp 299 fast on the rod. Said clamp 299 is screw threaded on the rod 298 to be adjustable thereon. As this stands in the path of the pusher or ejector 283, the latter is slotted at 302 to clear the rod 298 and the clamp 299. Further, to prevent said clamp 299 pinching the ejector 283 or in any way interfering with its reciprocation, the rod 298 has a distance washer 301 loose on it. Said washer 301 is thicker than the ejector 283 so that clamp 299 presses down upon it instead of upon the ejector; at the same time the slot 302 in the ejector 283 enables the latter to straddle and clear the distance piece. The outer end of the lever 296 is connected by a link 300 to a bell-crank lever 303 fulcrumed at 304 in the gib 217, its outer nose being situated so as to bear against the cross slide 270 when the latter is up, and press it against the mold. 304 is the only fixed fulcrum in the clamping mechanism, so that the latter is practically a toggle motion, and this mechanism clamps the cross slide without moving the mold. Thus there are fewer parts; the principal or larger part is the fixed and therefore the resisting part, the lighter parts are the ones to be forced up to it, and the forcing motion is in the lever 296 automatically shared between the rod 298 and the bell-crank lever 303. 305 is a bracket screwed to the cradle 10 and carrying a set screw 306 to supplement the before-mentioned means for holding the bottom section of the mold immovable on the cradle 10, and also to serve as a guide to the proper position or location of the mold when it comes to be refixed after it has been taken off for any purpose, e. g., cleaning.

*The type race.* (Figs. 5, 6, 7 and 8.)— 307 is a cap fixed upon the cradle 10. This cap is vertically adjustable for change of font by means of a liner 308 adapted to be substituted by one of another size duly marked after the same style as the linotype liners. 287 is the already mentioned detaining hook. 287 is pivoted at 309 and has a depressing spring 310. 311 (Fig. 8) is a rib to engage in the nicks in the type to steady them, 213, 213 are a pair of adjustable and spring depresser bars adapted to press upon the bellies of the type and thereby keep them together as they are moved along the race. The channel piece 216 forms as already stated, the bottom of the race. The substitute liner 308 constitutes the only new detail in the construction of this race. 312 is a clamped adjustable knife of suitable shape to cut the grooves in the feet of the type, as they are pulled past it.

*Ejecting a single type.* (See Figs. 3—3ᶜ, 5 and 6.)—According to the present invention there is the special ejector 283 (already mentioned), sliding between two gibs 314, 314 fast on the top section 280 of the mold on a level with the type race 210. 315 is a connecting rod adjustable for length to the top end of an arm 316 fast on a rock shaft 317 turning in bearings in the cradle 10.

318 is an arm fast upon the shaft 317, 319 a connecting rod from it to an arm 320 fast on a shaft 321 turning in a suitable bearing 322 fast on the vertical piece 1, and having fast on its opposite end a second arm 323 carrying a roller 324 which engages in the cam groove 325 (Fig. 2) of the cam 20 on the main shaft 3. The ejector 283 is so set that it delivers the type not only out of the cross slide 290 but into the race 210 far enough to clear the spring type detent 287. The ejector 283 is appreciably thinner than the type so that it cannot touch the spring detent 287 consequently the spring detent will descend behind the type even before the ejector has been withdrawn. When the ejector 283 is at rest it stands with its nose a short distance to the right of the cross slide face of the top section 280 (within the mold block) and starts on its ejecting motion as soon as the cross slide 270 presents the bottom side of the type flush with the bottom of the race 210. The cross slide 270 rests in this position for about three quarters of a revolution of the machine, this rest having the double advantage of giving the type then being cast time to cool and the ejector to eject the type then in front of it and to retreat. The motion of the ejector is slow and deliberate instead of being jerky.

*Water cooler.*—Any convenient system of cooling the mold by means of a water circulation is employed.

*Pump trip.* (See Figs. 1, 1ª, 3—3ᶜ and 15.)—According to the present invention the cam shaft 3 carries a suitably shaped cam 326. 327 is a bent lever fulcrumed at 328 on bracket 14 and engaging through a roller 330 by one end with the cam 326 and by the other end with the bottom end of the pump rod 329. The cam 326 can be slid along the shaft out of engagement with the lever 327, *e. g.*, when it is desired to put the machine through any of its operations when the metal is cold—as for instance if a type was left in the mold and it is desired to remove same.

*Galley.* (See Figs. 1, 2, 3, 4, 5 and 6.)— The improved galley consists of two parts, one 331 fast by its inner end to the cradle 10 and by its outer or left end to the bracket 12 and the other or movable part or galley proper 332 that can be taken off the machine along the line 333. The galley proper 332 is connected by crutches thereon and pins on the part 331 at that line, and by spring catches 335, 335, retractable by a cam device 336. The spring catches 335, 335, and the cam device 336 are carried in bracket 15. This bracket also supports the spring box 348 and the bottom end of the tube 343 (described further on), the top end of the latter being supported by a bracket 353 fast on the front plate 9. The top part 331 is adjusted for length of line by having the adjustable slide 337; and the bottom part by filling pieces 338 of different widths. 339 is one of the series of two-piece supporting ledges, each having a spring inserted between the two pieces to force them apart and so to hold the ledge by friction against the galley sides 332 or 331 on the right and the adjustable side 337 or the filling piece 338 on the left. The particular ledge in use is the one proper for measures of about the same length, more or less, as the one the machine is working on; but this one ledge by reason of its spring may do many measures of different but nearly the same length. The friction between the ends of a ledge and the galley is sufficient to support a short column, but the latter soon gets heavy enough to require that the ledge shall have additional support. This is afforded by a bracket piece the top or vertical portion 340 of which is adjustable laterally upon the bottom or horizontal portion 341 to enable it to coincide with the vertical center line of the column. The said bottom portion 341 is hinged to a slide 342 sliding in the vertical tube 343 having a slot 344 down its face. 345 is a cord fast to the slide 342 and passing over a pulley 346 down to a spiral groove 347 fast on the spring box 348, the connection being such that the increasing weight of the column winds up the spring and thereby increases the resistance or tension of it *pari passu*. But it is clear that the capacity of a spring for a column of 20 ems might not meet the requirements of 30 ems. To enable it to do so the box 348 is provided with a winder 349 (Fig. 4) (fitted with a non-return spring controlled pawl) by which the resistance of the spring may be increased or diminished as may be required. The bracket piece 340 and 341 can descend far enough to allow the feet of the ledge 339 to rest upon the bottom of the galley portion 332. When the column is up to or nearly up to the line 333, the ledge out of the next galley portion 332 is mounted in the portion 331 at the top to receive the next line from the machine, the bracket piece swung to the right, the portion 332 unlocked and taken out and away, and the next galley portion (duly adjusted) shipped, the bracket piece being then swung in and allowed to rise to the ledge last mentioned. To prevent the spring box 348 jerking the bracket piece up to the top of the galley during the removal of a full galley 332 and the shipping of the empty one, there is a lever 350 pivoted on the slide 342 and having an eccentric nose the major projection of which is at the top. 351 is a spring pulling up from a point on the slide 342 on the outer end of the lever 350 so that as said slide travels down the tube 343, the lever nose slides freely over the tube and locks against it as soon as the spring box begins to pull the slide up. When the new galley 332 has been shipped, the bracket piece is rocked back into it, the lever 350 unlocked and the bracket piece allowed to rise up to the ledge.

Starting with the line of type where the hook 186 leaves it on the left-hand but touching the stops or depressers 213, 213, the following is a description of the feed to the galley. The bottom half or member of the type race 210 is continued to the left hand far enough to provide a support for the line of type that the hook 186 has drawn clear of the depressers 213, 213, this bottom half being carried out as far as the end of the bracket 12. It is important that all jumping of the types of the line should be prevented during the time they are on the continuation of the race 210. For that purpose, there is provided a special device called a bail. 353 is a bracket fast to the main bracket 12. 354 is the bail pivoted at 355 in a pair of lugs on the top of the bracket 353. The operative portion of it has its bottom edge inclined upward from the continuation of the race 210 and is depressed by a spring 356 (Fig. 4) fast on each side of the bracket 353 and bearing upon a pin 357 on the side of the respective arm of the bail, so that the latter is always being urged downward toward the continuation. The nose of the front plate of the bail 354 extends into a notch 358 in the cap 307 so that the line is under the control of the bail before it is clear of the depressers 213, 213, and said nose is rounded off opposite the race to facilitate the entrance of the line of type under it. The bracket 12 is also slotted on the side next the mold to let the bail 354 through. The leading type is not supposed to pass the left hand end of the bail 354.

The line is pushed off the continuation by the following means. 359 is the pusher adapted to slide in grooves 360, 360, in the inner faces of the bracket 353. The pusher 359 is T-shaped in plan, and its pushing piece is thinner than its back piece being a flat plate fast upon it. The thinness of this plate adapts the pusher to deal with the thinnest and therefore with all bodies of type. The thinness being limited to the pushing piece does not rob the pusher as a whole of the rigidity necessary to a pusher. It has a rack 361 on its under side reciprocated by a sector 362 fast on a shaft 363 turning in the brackets 353, 353, a pinion 364 fast on said shaft 363 and a rack 365 on rod 366, which last is in engagement at its bottom end with a suitable cam groove (not shown) in the front face of the cam 196. The top of the rod works through a suitable slot guide (not shown) in the bracket 353 and the lower end is guided by its forked end 367 which straddles the end of the respective part of the shaft 194, while 368 (for the cam groove) is the roller on the side of the rod. When the pusher 359 starts to push a line of type off the continuation, the bail 354 is down and therefore in its path. The bail is raised by a cam piece 369 on the pusher 359 engaging with a bevel 370 on one arm of the bail 354. The line of type is pushed to the front until it lies fairly upon either the ledge 339 or upon the top line of type upon the ledge (as the case may be), with its feet flush with the rear face of the galley.

It has been already explained with reference to the galley that it, together with the column of type in it, is in constant equipoise. Consequently, the column of type must be pressed down the galley for a distance equal to the thickness of a line of type, i. e., till the top surface of the line that the pusher 359 has just acted on, is flush with the surface of the continuation. The means for so pressing down the line of type consist of a post 371 fast upon the pusher 359, a link 372 pivoted by one end to the post 371 and by the other to an arm 373 fast upon a rock shaft 374 turning in bearings in the two cheeks of the bracket 13. Each shaft end is continued through the respective cheek and has fast on it an arm 375. The outer ends of these arms have pivoted to them a bail—the depressor—consisting of two vertical pieces 376 and a horizontal bar 377. The bracket 13 has two projections, one—378—incorporated with it and the other—379—adjustable laterally upon it, and each ridge has a returned vertical plate or lip 380 and a short ledge 381, the whole forming a box or receptacle for leads which rest upon the ledges 381 and are held in a column between the brackets 13, the two projections 378, 379, and the two lips 380, 380. The projection 379 together with its lip 380 and ledge 381 must be adjustable laterally for variation in the length of the leads but no variation is necessary in the length of the bail. This adjustability is effected by a pair of slots 382, 382, in the bracket 13 and two locking screws 383 passed through the respective slots 382, into the projection 379 from the rear. The bail 377 actuated by the pusher 359 reciprocates over the faces of the lips 380, 380, being kept in contact with them by a spring 384 pulling on each piece 376 from the respective arm 375. 385 is a notch in the bail piece 377 to clear the upstanding top end of the respective side of the galley. The top end of the opposite or left hand side 337 of the galley—being part of the adjustable side or galley-piece 337—is a sliding piece 386 working in a slot in the side 337 and held in its normal position by a spring actuated plunger detent 387 likewise working inside 337. Its front face is cut away at 388 to allow the bail 377 to clear it. The reason why the piece 386 is a slider while the opposite top end is fixed arises out of the possible action of the line of type. The last type of the line is made to register with the inner face of the right hand galley-side, by the hook 186 but the register of the leading type with 386 might be spoiled by e. g., the capsize of itself or some intermediate type, or by an equivalent accident. In the event therefore of such an accident the push of the pusher 359 would be balked. To prevent this balking the top end 386 is a slider and would in the case mentioned be pushed out of the galley. Thereupon the operator rocks up the bail, which gives him access to the line, puts it in order again, replaces the bail and restores the piece 386.

When the matter is to be leaded, the leads (of the required thickness) are filled into the box and left standing upon the ledges 381, 381. The lips 380, 380 are both adjusted by the operator by means of the slots and adjusting screws 389 to make a gateway between their bottom ends and the ledges 381 of the proper size to allow a lead to pass. The lead-ejecting agent is two upstanding projections 390, 390 on the pusher 359. There are sufficient of these projections for there to be always two that will engage a lead. They are all of the same height—i. e., just less than the thickness of the thinnest lead.

Fig. 3 shows the contents of the galley 331, 332, as consisting of lines 450 of type and intermediate leads 451, a lead having been introduced into the galley so as to lie upon the top of each line 450 immediately after the latter was delivered into the galley. The lead 451 upon the top line 450, acts as a floor over which the next line to be delivered can move without disturbing the line underneath the said lead, but if the matter is not leaded, there is sufficient friction between the line being delivered and the top line in the galley, to push the type of the latter out of position. To prevent this pushing out of position, there is provided a line-of-type retainer consisting of a horizontal bar 452 pivoted to one side of the galley, say at 453—Fig. 3—and having a recessed face 454—Fig. 18—as long as the maximum width of the galley, to embrace the printing edge of the line of type when the retainer is swung into retaining position, in which it is held by a helical spring 455 pendent from an adjacent and relatively stationary part, say 386, and having a hook 456—Figs. 18 and 19—at its outer end which can be slipped over the coöperating end of the bar 452. 457 is a screw working transversely through the bar 452 and is set therein to engage with the part 386 to coöperate with the pivot 453 in holding the face 454 practically just in front of the plane on which the front face of the line of type stands when it has been properly delivered into the galley.

*Driving clutch and electrical means by which the line of type can, under certain circumstances, stop the machine.* (See Figs. 1, 10, 11, 12, 13, 14, 15, 22 and 23, inclusive.)—18 is the driving pulley and 3 the main shaft. 391 is a bore in the shaft for the pin 392 to work in. This pin is fast to a collar 393 that can slide upon the shaft under the action of the hand lever 394 that connects with it by the usual jaws carrying pins 395 engaging in the groove 396 in the collar 393. The nose 397 of the pin 392 inside the pulley 18 is tapered externally or (as shown) curved, while its opposite end is under the resilience of a spring 398 pressing between a nut 399 on the said end and the bracket. Moving the collar 393 (effected by the lever 394) toward the pulley 18 closes the clutch, a detent retractible by the electrical means above mentioned and described farther on holding the lever 394 in that closed position against the resilience of the spring 398. The nose 397 coöperates with a pair of radially positioned pins 400 working in a guide in a piece 402 fast on the shaft 3. The motion of the pin 392 toward the pulley 18 throws the pin 400 outward and rocks the levers 403 thereby making them expand the ring 404 which latter then presses against the pulley 18 with sufficient force to hold it practically to the shaft 3. The clutch just described is only an expanding one and well known. The shaft 405 of the hand lever 394 is continued downward where it connects by the lever 406 the link 407 to actuate the pins 395 above mentioned. The normal action of the spring 398 is therefore to unclutch (stop the machine).

The clutch is locked closed by a detent 408 on a bar 409 fulcrumed at 410 and under the pull of a spring 411. 412 is an arm fast on the shaft 405. The clutch closing motion of the lever 394 rocks the nose of the arm 412 over the bevel face of the detent 408, raising the latter until it is passed, whereupon it is locked by the spring 411 pulling the detent into its former (normal) position. This clutch locking and its unlocking by disengaging the detent 408 from the arm 412 are devised to be controlled by the machine, i. e., automatically when something goes wrong. For this purpose the machine is put into an electric circuit 413 which also comprises a battery 414 and a magnet 415 which latter has its armature 416 carried by that end of the lever 409 which is remote from the detent 408. One wire from the battery (preferably a negative one) makes electrical contact with a piece 417 that is fixed to the fixed galley side 331 forming part of the machine frame but insulated from it. This piece 417 is also a contact piece with which the type hook actuating lever 190 contacts just before the end of its stroke. It is also a cushioning piece for that stroke and after the stroke is made there is sufficient momentum in the lever to beget a rebound that suffices to break the circuit there (the lever 190 being electrically part of the machine). The type depressing bail 354, or rather the front member of it, has a central slot 418 along it, to receive the device next mentioned which is adjusted along it according to the length of the lines of type which the machine is casting. The device may not contact with the bottom of the type race 210 and to prevent that the bail 354 has a lip 419 that holds the lowest member of the device clear of it. This device must necessarily be insulated from the machine. The first piece to be mentioned is the block 420 of fiber (or other non electric material) which rests upon the bail 354. 421 is a fastening screw passed through the block 420 and the slot 418. 422 is a spring contact finger fast by its head to a twice bent rocking piece 423 fulcrumed at 424 to a right angled piece 425 that is let into a slot in the block 420 and riveted there (N. B. The only two insulations are the block 420 and that between 417 and the machine—all the other parts are metal). The other wire is connected to the upstanding top of the right angled piece 425. 426 is a contact adjustable in respect of the bail 354. The normal position of the piece 423 is that the contact 426 is in contact with the bail 354 (i. e., with the machine) and that the spring 422 is some distance out of contact, so far off in fact that it is possible to rock the piece 426 up out of contact, without putting the finger 422 into contact. 427 is a returning spring resilient between the rocking piece 423 and the block 420 (it is fixed to the latter) to return said rocking piece 423 after contact between this latter and the bail 354 has been broken. This automatic device for stopping the machine does not act or does act as follows, the device having been set to hold the lower nose of the rocking piece 423 so that the leading type of the line shall touch it when the lever 190 reaches the end of its ejecting stroke.

(1) When the line being ejected by the lever 190 is full length and otherwise normal, it comes up to the nose of the rocking piece 423 and rocks it up enough to break contact between the contact 426 and the bail 354 without making contact between the spring 422 and the bail 354. This leaves the circuit open (in spite of the fact that the lever 190 made contact with the piece 417) and the clutch closed because all is right.

(2) If the line is too short or if there is no line at all (as there would not be if a tear, for instance, in the controller had adrived under the feelers), the contact piece 426 is not raised, and closure is effected by the lever 190 at the point 417, the result being that the armature is attracted and the spring 398 freed whereupon the clutch is opened.

(3) If the line is too long, contact between the contact piece 426 and the bail 354 is broken and made between the spring 422 and the bail 354, then between the lever 190 and the piece 417 with the same result as (2). It is to be noted that the excess length of line can rock up the rocking piece 423 as high as is required without doing any mischief because 422 is a spring finger.

Now it often happens that the operator, quite apart from anything going wrong in the machine, desires to open the clutch to stop the machine. To meet such a requirement there is a throw-out lever 428 kept in position by straddling the shaft 405 and fulcrumed by a projection on the hub of the arm 412. Its opposite end is forked to engage under the head of a pin 429 screwed into the adjacent end of the bar 409. Raising the outer end of the throw-out lever 428 will therefore set the spring 398 free to open the clutch.

The operation of casting and composing a type is as follows. The controller 22, drawn over the bridge piece 32 intermittently, by cam 19 and the parts connecting it to the finger 48, stops with one perforation of each series $b$ and $c$ for character and one of series $d$ for setting the mold under the corresponding selecting pins 62—Fig. 24—and over the corresponding holes 33— Fig. 29. Whereupon the three pins 62 are pushed down through the holes 33 by the respective springs $60^b$ upon the coöperating levers 64 which raise the respective pins 68 making the top ends of the two character pins stand up above the rocking frame 69 high enough to contact with the respective wheel pins 75. The frame 69 is then rocked—Fig. 30—to the rear to have the number of upstanding pins 68 checked by the safety device 118, and then to the front. If the said number is correct, the two upstanding pins 68 push the corresponding wheel pins 75, one in each wheel 76, 77, into the respective matrix carrier slides 93, 94— Figs. 3, $3^a$. At the same time, the pin 68 that had been pushed up by the pin 62 in connection with setting the mold, makes the coöperating pin 221—Fig. 21—acting through the rack 223, the incline 234 and the blade 237, set the mold; the wheels 76, 77 acting through the matrix carrier slides 93, 94, make the matrix carrier 131 position the matrix corresponding to the two $b$ and $c$ perforations in the controller opposite the mold; the slide 270—Fig. 6—completes the mold; and the rocking frame 69 is rocked back to its original position. The lever 144—Figs. 4, $4^a$, $4^b$—makes the impression pin 142 press the positioned matrix metal tight to the mold, the pump nipple is unchoked and the pump injects metal into the latter, thereby casting a type. The slide 270 is then reversed and the blade 237 pushes the type on to the top of it. The slide 270 is next raised to the level of the type race 210 and the ejector 283 pushes the type off the said slide into the race.

I claim,

1. The combination of a pair of feed disks having feed pins; a pivoted plate in which the said disks can turn; a latch to hold the said plate in working position, a spring tending constantly to disengage the latch from the plate; and a finger cam to engage it therewith in opposition to the resistance of said spring.

2. The combination of a pair of feed disks and ratchet wheel; a longitudinally reciprocating slide; a spring finger carried by the said slide to turn the said wheel intermittently by pushing on its teeth successively a beveled nose on the same slide to engage between two adjacent teeth on the wheel; a locking pawl adapted to engage the same ratchet wheel; a spring holding the said pawl in engagement with the said wheel and means for reciprocating the said slide.

3. The combination of a pair of feed-disks and ratchet wheel; a longitudinally reciprocating slide; a spring finger carried by the said slide to turn the said wheel intermittently by pushing on its teeth successively; a beveled nose on the same slide to engage between two adjacent teeth on the wheel; a locking pawl adapted to engage the same ratchet wheel; a spring holding the said pawl in engagement with the said wheel; means for reciprocating the said slide; and a finger key on said pawl on the side of its pivot opposite to the nose thereof.

4. The combination of selecting pins; springs to engage them in the perforations presented by the controller; levers engaging with the respective selecting pins to disengage them from the said perforations; a rod coöperating with all the said levers and automatic means to make it disengage the engaged selecting pins from the respective perforations; vertical pins in the rocking frame respectively in touch with the said levers to be raised in the said frame by the engagement of the respective selecting pins in the controller; horizontal intermediate pins held by springs in contact with the top ends of the respective vertical pins; coördinate wheels and wheel pins alined with the respective intermediate pins.

5. The combination of selecting pins, a vertical plate, coördinate wheels rotatably mounted therein, longitudinally movable wheel pins carried by said coördinate wheels, and provided with slots, means for operatively connecting the wheel pins with the selecting pins and means engaging with the slots in the wheel pins for limiting their movement.

6. The combination with a series of wheel pins, a rocking frame, slides controlling the position of the matrix carrier and slotted to receive the wheel pins, of projections connecting to the racking frame and adapted by following the wheel pins closely to enter the slots in the said slides when the wheel pins are not in them.

7. The combination of wheels; wheel pins capable of reciprocation therein; intermediate pins normally alined with the respective wheel pins before the wheels are turned; means for pushing the intermediate pins against the wheel pins and means for returning both to their normal positions.

8. The combination of wheels; wheel pins; intermediate pins; pivoted frame carrying the latter; vertical rocking frame; vertical pins therein to coöperate with the intermediate pins; and means for rocking said frame about its axis, said means comprising a rock shaft not coincident with the axis of the rocking frame, levers thereon in the same plane as the rocking frame, self adjusting connection between the said levers and the rocking frame, a cam, and means for operatively connecting said cam with said rock shaft.

9. The combination of wheels; wheel pins; intermediate pins; pivoted frame carrying the latter; vertical rocking frame; vertical pins thereon to coöperate with the intermediate pins; pivoted safety dogs and stop pins for the same; pivoted frame carrying the said dogs and stop pins; connection between the two pivoted frames and detent to lock the intermediate pins out of reach of the vertical pins.

10. The combination of wheel pins; intermediate pins normally alined therewith; automatic means for making selected intermediate pins engage the respective wheel pins; automatic means for preventing any engagement when the selection is an erroneous one and manual means for throwing the last mentioned automatic means out of action.

11. The combination of matrix carrier slides; two peripherally toothed wheels for actuating the same; a rack toothed on both edges between the wheels and engaging with both of them; means for actuating said rack; a vertical plate (9); plates carried by one face of said vertical plates and in the line of the rack for keeping said rack and wheels in position, and plates out of the line of the rack for keeping the wheels in position.

12. The combination of a matrix plate, a wheel; means for imparting motion to said wheel; a slide operatively connected with said wheel; a link connected with said slide; a hook carried by said link engaging with said matrix plate; a roller carried by said hook and adapted to support said matrix plate.

13. The combination of a matrix plate; a ledge thereon; a slide; a link connected therewith; a hook; a thumb screw detachably connecting said hook with said link in engagement with said ledge; and means for imparting vertical motion to said slide to actuate through the medium of the link, the matrix plate.

14. The combination of one wheel; matrix carrier slide actuated thereby; matrix carrier; bell crank lever connecting its respective ends to the said slide and carrier; and a link coöperating with the said bell crank lever to control the matrix carrier.

15. The combination of a series of matrices, a mold, a movable mold nipple, an impression pin for impressing a matrix against the mold, means for actuating said impression pin, separate means independent of said actuating means for positively moving said mold nipple against the mold, and means for preventing said nipple-moving means from shifting said nipple out of alinement with the mold, that is, for positively holding said nipple in alinement while allowing it to move along the line of alinement.

16. The combination of a controller; means for feeding same; means for actuating said feeding means; a series of matrices; a mold; a movable mold nipple; an impression pin adapted to actuate a matrix; means independent of the feed-actuating means for actuating said impression pin; and means adapted to be actuated by the feed-actuating means for moving the mold nipple against the mold.

17. The combination of matrix pins; a lever having a recess in one of its faces and having also a pin cavity; means for actuating same; an impression pin loosely slidable in said cavity; a curved surface washer surrounding said impression pin and loosely fitting into said recess; a nut on said impression pin; and a spring intermediate the nut and the washer, cushioning the impression pin relatively to the matrix pins.

18. The combination of a mold; a metal pot; a nozzle thereon in alinement with the mold, means for pressing said nozzle against the mold, and means for positively preventing said nozzle from being moved out of alinement with the mold.

19. The combination of a mold; a metal pot; a nozzle pertaining to said metal pot; a pin adapted to press said nozzle against the mold; a spring constantly pressing said pin toward said nozzle, and means for retracting said pin from the nozzle.

20. The combination of main frame; a mold; means for holding said mold fixed relatively to said main frame; a metal pot; a nozzle pertaining to said pot; a pressure spring of known strength; and means for transmitting the pressure of said spring to said nozzle so as to tend constantly to press same against the mold; said spring being weaker than the means that hold the mold against the main frame.

21. The combination of a mold; a metal pot; a movable member including a nozzle pertaining to said metal pot; a socket; a pin movably located in said socket; a spring in said socket tending constantly to press said pin against the aforesaid movable member to press the same against the mold; a cam surface on said socket; a lever on said pin adapted when turned to ride over said socket and thereby retract or release said pin.

22. The combination with a mold, a metal pot, a member, including a nozzle, pertaining to said metal pot, said metal pot and its said member being rotatable bodily to bring the nozzle into and out of the casting position; of a pin; a spring adapted normally to press said pin against the aforesaid movable member; and an arm carrying said pin and spring and having a cam surface; and hand-operable means held against said cam surface by the spring and adapted to be moved over said cam surface in a plane, approximately at right angles to the direction of motion of the pin to withdraw said pin so as to permit the pot and movable member to be swung away from the mold.

23. The combination of a mold; a metal pot rotatable upon its axis; a vertical standard carrying said metal pot; means for raising and lowering the metal pot bodily upon its standard relatively to the mold; a nozzle; a choker therefor; means for actuating said choker; and yieldable means for preventing said actuating means pushing the nozzle out of alinement with the mold.

24. The combination with a metal pot, a nozzle, a choker, a cam disk provided with a cam path, an oscillating lever and a roller on said lever engaging said cam path; of means for operatively connecting said lever with the choker with capability of lost motion, such means including a connecting rod jointed to said lever; a nose piece carried by said connecting rod; a co-acting rod having a part projecting into the path of and adapted to be engaged by said nose piece, but normally slightly removed therefrom; an oscillating lever connected with said co-acting rod; and a shaft connected with said last named lever and with the choker.

25. The combination of a controller; a slide for feeding same; means, comprising a cam, an oscillating lever, and connecting means, for actuating said slide; a metal pot; a nozzle; a choker; and connecting means from said oscillating lever to said choker for actuating the same at desired times relatively to the controller feed.

26. The combination of a metal supply; a choker therefor; a push rod for actuating said choker; a push piece for actuating said push rod; means for actuating said push piece; a rocking frame; means for oscillating said frame at determined times; and a connection between said rocking frame and said push rod for moving said push piece out of the action of the push rod, and means for returning said push rod.

27. The combination of pivoted safety dogs and stop pins for same; pivoted frame carrying said dogs and stop pins; a choker, and a push rod connected therewith; a push piece for actuating said push rod; means for actuating said push piece; and means for operatively connecting said pivoted frame with said push rod.

28. The combination of a metal pot; a nozzle therefor; a choker; a controller having a galley perforation; a selecting pin or feeler for said perforation; a rocking frame; a pin carried by said rocking frame; means for actuating said choker to open the nozzle; means for connecting said pin with said actuating means to prevent the opening of the nozzle; and means for operatively connecting said pin with the feeler or selecting pin.

29. The combination of a metal pot; a nozzle; a choker; a push rod for actuating said choker; a crank having a plurality of arms, one arm engaging said push rod; a block on another arm of said crank; a rocking frame; a pin carried thereby; a controller; means controlled thereby for rocking said frame; an intermediate pin frame; an arm thereon engaging said block; and means on said block for engaging said pin to rock said crank.

30. The combination of a choker, opening means therefor; a controller; a crank for preventing the operation of said opening means; and means for operatively connecting said crank with the controller; said crank comprising a pivoted arm engaging the opening means, a guide therefor; a second arm, a block thereon engaged by said connecting means and a spring for returning said crank to normal position.

31. The combination of means for feeding metal for a cast; a wheel; wheel pins therein; a rocking frame; means for rocking it, vertical pins carried by said rocking frame; means for operatively connecting said vertical pins with said wheel pins; another pin carried by said frame; and means actuated by said pin for preventing a cast.

32. The combination of casting mechanism, a controller; a pin controlled thereby; means connecting said pin with said casting mechanism to stop a cast; a type race; means for withdrawing a line of type therefrom; and means for connecting said pin with said withdrawing means to start the same.

33. The combination of a type hook; a shaft; a worm thereon; a worm wheel gearing therewith; a shaft carrying said worm wheel; a half crank thereon; a connecting rod; a bell crank; and means for connecting said bell crank with said type hook.

34. The combination of a type hook; a bracket provided with a slot; a link; means slidable in said slot for pivoting said type hook and link together; a bell-crank connected to said link; and means for oscillating said bell crank.

35. The combination of a drive shaft; a type hook; an intermediate shaft; means gearing said intermediate shaft with said drive shaft in a speed ratio of one to eight; and motion converting means for transmitting reciprocatory motion to said type hook from said intermediate shaft.

36. The combination of a type hook; a drive shaft; a severed intermediate shaft; gearing means between said intermediate shaft and one section of said drive shaft; connecting means between the type hook and the other section of said intermediate shaft; a controller; and means controlled thereby for coupling together the sections of the intermediate shaft.

37. The combination of a severed shaft; means for positively driving one of its sections; a type hook; connecting means between the other section and said type hook; a controller; a crank; means for oscillating said crank from said controller; a coupling for the sections of said shaft; and connecting means between said crank and said coupling for setting the same in action.

38. The combination of a type hook; two alined shaft sections; means operatively connecting one of said sections with the type hook; means for positively driving the other section; a ratchet wheel on one section; a cam on the other section having a slot; a spring pressed detent therein; a pawl adapted normally to prevent said detent engaging said ratchet wheel; means for freeing said detent, and means for actuating said freeing means at determined times.

39. The combination of two alined shaft sections; means for positively driving one of them; a ratchet wheel on said section; a complemental cam on the other section; a detent on said cam; a spring adapted to press said detent into engagement with said ratchet wheel; a pawl for normally preventing said engagement; means for rendering said pawl inoperative at predetermined times; and means for delaying the return of said pawl to operative position at such times.

40. The combination of means for effecting a cast; a four armed crank; a controller;

means controlled thereby for oscillating said crank through one of its arms; means for returning said crank; means operated by a second arm thereof for preventing a cast; a type hook; a shaft; connecting means between said shaft and the type hook; means for coupling said shaft to power; means operatively connected with a third arm of said crank for preventing said coupling at predetermined times; and means adapted to engage the fourth arm so as to lock said crank at the end of such times.

41. The combination of a type hook; a shaft for actuating it; driving means therefor; means for connecting and disconnecting said shaft from the drive; a crank for actuating same; a detent for locking said crank at predetermined times; a rocking frame; a lever for rocking it; and a pin carried by said frame for disengaging the crank from the detent.

42. The combination of a crank; means for rocking it at predetermined times; a spring-controlled detent adapted to lock said crank and having a cam surface; a rocking lever; means for rocking it; and a pin on said lever so positioned relatively to the detent that the return of the rocking lever to its central position only brings said pin to the foot of the cam surface, while its continued motion in the same direction carries the pin up the cam surface to unlock the crank.

43. The combination of a race; a cross plate having an aperture; a type hook partially projecting thereinto when at rest; a crank; means for connecting it with said hook, said crank when at rest being just short of its bottom dead center; a spring tending to hold said hook up to the race; and means for rotating said crank to cause said hook to pass through said aperture and along the race.

44. The combination of a hook; a race having an exit therefor intermediate of its ends; an apertured entrance plate for said hook at one end of the race; a spring tending to hold said hook up to the race; means for moving the hook along the race; means for positively holding up said spring during the forward travel; and means for withdrawing said spring during the return travel to allow of the exit of the hook.

45. The combination of mold sections; a front plate; a screw and dowel for securing said front plate to one of said sections; means for securing said front plate to the other section; an apertured end plate; a set way section slidable in said aperture; and means for guiding the travel of said set way section.

46. The combination of a mold; a slidable set width section; a roller connected therewith; a rack bar; a stepped block carried thereby; means for reciprocating said rack; an adjustable stop on said rack bar; an incline carried by said rack bar adapted to engage said roller and move same an amount proportional to the movement of the rack bar; a rocker frame; and pins carried thereby adapted respectively to engage the several steps of the stepped block.

47. The combination of a pin wheel; a wheel geared therewith; a pinion; a pressure device for connecting said pinion with said gear wheel; a rack bar gearing with said pinion, and carrying a stepped block, an adjustable stop and an incline; a rocker frame; pins thereon in the paths of the respective steps; a roller in the path of the incline; and a blade operatively connected with said roller.

48. The combination of a mold; a set width section; means including a rack and pinion for sliding said section through a predetermined amount; a wheel adapted to drive said pinion by face friction; a pin wheel geared therewith to drive same; and an adjustable stop set to arrest said rack bar before said pin wheel has finished its drive.

49. The combination of a mold; a set width section, a bar; means for reciprocating same; connecting means between said bar and said section; and means comprising a stepped block, pivoted arms and an adjustable stop for determining the length of travel of said bar; there being a clearance between said stop and said block to permit said arms to swing fairly into the paths of the respective steps.

50. The combination of a slidable blade; a block provided with steps; means for reciprocating same; connecting means between said block and said blade; means for selectively engaging said steps; an adjustable stop; and means interposed between said stop and said block to take the shock of contact of said stop.

51. The combination of a mold; a set width section therein; a bar; means for moving said bar through selected distances of travel; a roller connected with said mold section; a wedge adjustably mounted on said bar and adapted to engage said roller and move same proportionately with the travel of the bar; and means for adjusting the angle of said wedge.

52. The combination of a slide; a roller thereon; a bar; a movable wedge thereon adapted to slidingly engage said roller; means for reciprocating said bar; a set screw for adjusting said wedge; a spring tending to keep said wedge in contact with said set screw; locking means for the wedge; and locking means for the set screw.

53. The combination of a mold; a set width section; a slide; projections thereon; a nut between said projections; a screw fast with said nut; an engagement piece for said screw movable relatively to said slide; means for locking said engagement piece relatively to the slide and means connecting it with the set width section.

54. The combination of a bar; a wedge thereon; a slide; a roller thereon in the path of said wedge; means for reciprocating said bar to move the slide; a spring tending to return said slide; and a stop to limit said return.

55. The combination of a cradle; a bracket thereon; a tommy headed screw therein; a lock nut on said screw; a slide on said cradle normally abutting against said screw; a movable body having an engaging surface; means for actuating it; and a roller on said slide located in the path of said engaging surface.

56. The combination of a mold; a slidable mold section therein; a slide connected therewith; means for moving said section to set the type width; and means, including a roller on said slide and a cam adapted to engage said roller, for moving said section to eject the type.

57. The combination of a horizontally movable slide; a roller carried thereby; a cam movable in a path containing said roller; a vertically movable slide for actuating said cam; means for reciprocating last named slide; a guide for the same; and means for compensating the non-throw movement of said slide.

58. The combination of a slide; a bracket thereon; a roller carried by said bracket; a cam adapted to have operative contact with said roller to move the slide; means for actuating said cam; means for returning said slide; and means independent of said cam for limiting said return.

59. The combination of a mold; a type removing slide; means for ejecting the type from the mold onto said slide; a type race; means for moving said slide up to said race at predetermined times; a pusher; and means for actuating it to push the type from the slide into the race.

60. The combination of a mold having an ejection cavity; type casting means; a type race; a slide; means for moving said slide up to said race; said means being timed to keep said slide elevated during the casting of a type so as to keep said cavity closed by the face of said slide.

61. The combination of a mold having a cavity; ejecting means; a slide having an opening adapted in one position to receive a type; a hard piece or face below said opening on said slide adapted to close said cavity; and means for moving said slide into its cavity closing position.

62. The combination of a mold; a slide; means for transferring a type from the mold to the slide; spring-pressed means for holding down the type during such transference; a type race; means for transferring a type from the slide to said race; and spring pressed means for holding said type down on said race.

63. The combination of a mold; a slide; means for transferring a type from the mold to the slide; a presser carried by the slide; a race; means for transferring said type from the slide to the race; and a presser above said race; one of said pressers having a cavity and the other presser having a prolongation adapted to enter thereinto.

64. The combination of a slide adapted to receive a newly cast type; a type race; means for transferring said type thereto; a detent for holding down said type during its interference; a knife beyond said detent for trimming said type; a chute adapted to receive the jet; and a tube communicating with said chute.

65. The combination of a mold having a cavity; a slide having a face adjacent to said cavity; a bell crank lever; means for operating same to press it against said slide; a frame; and means for fixing said mold immovably thereon.

66. The combination of a mold; a clamp; a reciprocating rod connected thereto; and means, connected with said rod for operating the clamp to clamp the mold in place.

67. The combination of a mold; a slide adjacent thereto; a bell crank lever adapted to bear against said slide; a clamp adapted to bear against said mold; and means for simultaneously actuating the clamp and bell crank lever to move the slide while fixing the mold.

68. The combination of a mold; a clamp; a distance piece between them; a forked ejector straddling said distance piece; and means for actuating said clamp to hold the mold fast.

69. The combination of a mold; a cradle; a bracket thereon; a set screw in said bracket adapted to abut against said mold; and means for actuating the clamp to hold the mold fast.

70. The combination of a mold; a set width section, a slide connected therewith, a cam for actuating said slide; a second slide operatively connected therewith, a lever connected with said second slide; a clamp, means for connecting it with said lever; a cross slide adjacent said mold, a bell crank adapted to bear upon it, and means for connecting said bell crank with said lever.

71. The combination of a cradle; a type race; a cap; and a liner between said cap and the cradle to adjust the height of the type race.

72. The combination of a channel piece constituting the bottom of a type race; a cap constituting the top of said race; an adjustable knife located in such position in said race as to cut grooves in the feet of the type; and means for pulling the type past said knife.

73. The combination of a mold; means for ejecting a type therefrom; a slide adapted to receive said type; and independent means for ejecting the type from said slide.

74. The combination of a slide; means for transferring a type thereto; means for moving said slide from its receiving position; an ejector for ejecting the type from the slide; and means for actuating said ejector, timed to operate after the said motion of the slide.

75. The combination of a mold; an ejector; a slide; a second ejector thinner than the first one; and spring pressed means for holding down the type during the action of the second ejector.

76. The combination of a slide; means for placing a type thereon; a race at a different level; means for moving the slide to the level of the race said means being timed to rest for an interval in the last named position of the slide; an ejector; and means for actuating said ejector during said interval to push the type into the race.

77. The combination of a galley proper; a fixed part; means for supporting said fixed part on a machine; a crutch and pin device for supporting the galley proper on said fixed part; a spring catch adapted to engage said galley; and means for retracting said catch.

78. In a galley, the combination of a fixed upper part; a movable side thereon; a lower part; means for removably connecting same to the upper part; means for adjusting said movable side for length of line in the upper part; and a filling piece for adjusting length of line in the lower part.

79. The combination of a galley having a fixed side; adjustable members forming the other side; a transverse slidable ledge between them formed in two pieces; and a spring between said pieces.

80. The combination of a galley; a ledge slidable therein; means for frictionally resisting its travel; a guide; a slide thereon; means for resisting its travel; a cross piece on said slide; a connecting piece between said cross piece and the ledge; and means for adjusting said connecting piece relatively to the cross piece.

81. The combination of a galley; a ledge therein; a bracket below said ledge; a slide connected thereto; means for guiding same; a cord connected to the slide; a pulley; and a spring box connected with said cord.

82. The combination of a galley; a spring box; a winder therefor; a non-return pawl; a cord wound on said spring box; a pulley therefor; a slide connected to said cord; a guide therefor; a bracket on said slide; and a ledge upon said bracket.

83. The combination of a galley, a ledge therein; a guide; a slide; a bracket thereon adapted to yieldingly support said ledge; a cord connected therewith; a spring box adapted to wind up said cord; and means for locking said slide relatively to the guide.

84. The combination of a slotted tube; a slide therein; a galley; a type support therein pivotal about the slide in a plane at right angles to the face of the galley; a cord attached to the slide; and means for maintaining said cord in tension.

85. The combination of a type race; a depressor therein; a continuation of said type race; a bail over said continuation; and means for yieldingly holding down said bail.

86. The combination of a type race; a depressor therein; a bail; and means for yieldingly holding down the bail; the area of influence of the bail overlapping the area of influence of the depressor.

87. The combination of a type race; a fixed bracket; a bail pivoted thereon having its operative bottom edge portion inclined upwardly from the race; a curved nose thereon; projections on the bail; and a spring yieldingly engaging said projections.

88. The combination of a type race; a bail adapted normally to lie in its lower position; a pusher; means for actuating same; and inter-acting means between said pusher and bail to raise the latter by the travel of the former.

89. The combination of a type way; a pusher; a rack; a sector adapted to mesh therewith; a pinion; a shaft carrying said sector and pinion; a rack gearing with said pinion; a rod connected therewith; and means for intermittently reciprocating said rod.

90. The combination of a type way; a pusher; means including a rack and sector for reciprocating same; a pinion connected with said sector; a rack engaging therewith; a rod carrying said rack; a fork at its other end; a shaft straddled thereby; and a cam on said shaft adapted to reciprocate said rod.

91. The combination of a type way; a pusher comprising a thin pushing piece and a thicker back piece; a guide therefor; means for reciprocating the pusher at predetermined times; and a galley.

92. The combination of a galley; means for keeping said galley normally in equipoise; a type support; means for pushing type therefrom into the galley; and means for pressing down the galley a predetermined amount after each such operation.

93. The combination of a galley; means for normally maintaining it in equipoise; a pusher for transferring a line of type to the galley; a bail for depressing said galley; and means for operatively connecting said bail with the pusher.

94. The combination of a galley; means for yieldingly supporting it; a pusher; a post thereon; a link pivoted thereto; a rock shaft; an arm thereon pivoted to said link; a bail; and arms on said rock shaft connected with said bail.

95. The combination of a galley; means for transferring a line of type thereto; and a box or lead container above said galley comprising a bracket, a plurality of projections thereon, means for adjusting one of said projections laterally relatively to the other; and a vertical lip and a ledge on each of said projections.

96. The combination with a galley and means for transferring a line of type thereto of a bracket provided with a plurality of slots; a fixed projection on said bracket; a vertical lip thereon; a ledge also on said projection; an adjustable projection; a lip thereon; a ledge also thereon; and means slidably located in said slots for holding the adjustable projection in place.

97. The combination with a galley and means for yieldingly supporting same of a depressor bail; a pusher; means for operatively connecting said bail with the pusher; guides for the bail; and means for holding the bail slidably in contact with said guides.

98. The combination of a galley; means for yieldably supporting same; a depressor bail having a part cut away to clear said galley; and means for operating said bail at predetermined times to depress the galley.

99. In a galley the combination with one of its sides of a laterally movable top piece and means for yieldably holding said top piece normally in alinement with said side.

100. The combination of a galley having one of its upstanding top ends fixed; a movable top piece at the other side; a spring-pressed detent for holding said movable top piece yieldably in place; means for yieldably supporting said galley; a depressor bail cut away to clear one of said top ends, the other top being cut away to clear the bail; and means for actuating the bail at predetermined times.

101. The combination of a shaft; a pulley; means for clutching same to the shaft; means tending to unclutch same; a detent adapted normally to resist said tendency; a typeway; means for feeding a line of type along same; an electric circuit; a contact normally closing said circuit; and means controlled by the type feed devices for opening said contact, said means being adjusted to operate only in the absence of correct length of line.

102. The combination of a shaft; a pulley; means for clutching said pulley; means tending to unclutch same; a detent adapted normally to resist said tendency; a typeway; means for moving a line of type along same; a movable abutment projecting into the path of said type; and means connected therewith for controlling the detent.

103. The combination of driving means; means for connecting same with power; means tending to disconnect same; a detent adapted normally to resist said tendency; an armature connected therewith; an electric circuit including a contact and a magnet; a type way; means for moving a line of type along same; and a trip device just out of reach of a line of normal length for closing said circuit and disengaging the detent.

104. The combination with a machine of driving means therefor; connecting means between them; a type way; means for feeding a line of type along it; an electric circuit; two contact makers therein, one located just beyond the normal path of a line of type and the other just before the normal limit of movement of the type feeding means.

105. The combination of a type way; a bail; a clutch; a detent; an electrically operated device for disengaging same; a circuit closer therefor carried by the bail; insulating means between the circuit closer and the bail; means for feeding a line of type along said way; means for adjusting the position of said contact relatively to the type way; and insulating means between the contact and the bail.

106. The combination of a bail; an electric circuit normally open; a clutch; locking means therefor; means connected in said circuit for releasing same; means for imparting travel to a line of type; and a trip device adapted in predetermined conditions to be actuated by said line of type to close the circuit.

107. The combination of a type way; a bail; an insulating block carried thereby; means for adjusting its position on the bail; a rocking piece carried by said block and projecting into the type way; a circuit closer on said rocking piece normally open; driving means; power transmission means; a clutch adapted to connect them; and electrically controlled means including said circuit closer for releasing said clutch.

108. The combination of a type hook; a lever for actuating same; an electric circuit including said lever; a type way; a rocking piece; contacts thereon, one normally closed and the other normally open; a projection on the rocking piece so positioned relatively to the type way that when tripped by a normal line of type both contacts will be open but when further tripped by a longer line one contact will be closed; a contact adapted to close with said lever when the lever moves beyond its ordinary limit; driving means; a clutch; and means controllable by the circuit for disengaging the clutch.

109. In a machine, the combination of hand controllable means for connecting same with power; means tending constantly to cover said connection; a locking device for maintaining said connection; electrically operated means for unlocking same; a type way; means for moving a line of type along same; means adapted to be actuated by undue length of line for closing the circuit of said unlocking means; and means adapted to be controlled by the absence of sufficient length of line for closing said circuit.

110. In a machine, the combination of means for connecting same with power; manually operated means for controlling said connection; automatic means for controlling said connection in a predetermined emergency; and automatic means for controlling said connection in another predetermined emergency.

111. In a machine, the combination of means for mechanically connecting it with power; manually-operated means for establishing said mechanical connection; manually operated means for severing said connection; means for pushing along a line of type; and means controllable thereby for severing the aforesaid connection whenever the line of type is not of predetermined length.

In witness whereof I have hereunto set my hand in the presence of two witnesses.

WOOLMAN GIBSON WHITE.

Witnesses:
JOHN F. MAY,
GEO. R. MAY.